(12) United States Patent
Ponec et al.

(10) Patent No.: US 11,994,347 B2
(45) Date of Patent: *May 28, 2024

(54) SYSTEMS FOR MANAGING THERMAL ENERGY WITHIN A THERMAL STORAGE SOLUTION

(71) Applicant: Antora Energy, Inc., Sunnyvale, CA (US)

(72) Inventors: Andrew Joseph Ponec, Fremont, CA (US); Justin Briggs, Oakland, CA (US); David Bierman, Oakland, CA (US); Sam Kortz, Palo Alto, CA (US)

(73) Assignee: Antora Energy, Inc., Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/847,993

(22) Filed: Jun. 23, 2022

(65) Prior Publication Data

US 2022/0412228 A1 Dec. 29, 2022

Related U.S. Application Data

(60) Provisional application No. 63/215,404, filed on Jun. 25, 2021.

(51) Int. Cl.
*F28D 20/00* (2006.01)
*F01K 3/12* (2006.01)
(Continued)

(52) U.S. Cl.
CPC ............ *F28D 20/0056* (2013.01); *F01K 3/12* (2013.01); *F01K 3/186* (2013.01); *F01K 13/02* (2013.01);
(Continued)

(58) Field of Classification Search
CPC .............. Y02E 60/14; F28D 20/00–028
See application file for complete search history.

(56) References Cited

U.S. PATENT DOCUMENTS 2,142,383 A * 1/1939 Smith ............ H01T 13/56
200/82 R
4,421,661 A * 12/1983 Claar ............ C09K 5/063
428/404
(Continued)

FOREIGN PATENT DOCUMENTS

CN 101303207 A * 11/2008
CN 107314696 A * 11/2017 ......... F28D 20/0056
(Continued)

OTHER PUBLICATIONS

International Application No. PCT/US2022/034953, International Search Report and Written Opinion dated Oct. 7, 2022 10 pages.
(Continued)

*Primary Examiner* — Laert Dounis
(74) *Attorney, Agent, or Firm* — Fredrikson & Byron, P.A.

(57) ABSTRACT

A thermal storage solution system is disclosed herein. The system includes an insulated container having a thermal storage medium, a heating element configured to heat the thermal storage medium, a heat receiving unit (e.g., thermophotovoltaic (TPV) heat engine, heat transfer fluid, an industrial process component) configured to convert heat into electric energy, and a mechanism configured to control a view factor between the thermal storage medium and the heat engine. In another embodiment, the system includes multiple thermal storage media as unit cells in a single enclosure or container with insulation between adjacent unit cells.

29 Claims, 20 Drawing Sheets

(51) Int. Cl.
*F01K 3/18* (2006.01)
*F01K 13/02* (2006.01)

(52) U.S. Cl.
CPC ............... *F28D 2020/0069* (2013.01); *F28D 2020/0078* (2013.01); *F28D 2020/0086* (2013.01); *Y02E 60/14* (2013.01)

(56) References Cited

U.S. PATENT DOCUMENTS

| | | | | |
|---|---|---|---|---|
| 4,424,800 | A * | 1/1984 | Ortega | F28D 20/0056 126/633 |
| 10,978,720 | B2 | 4/2021 | Taylor | |
| 2005/0126172 | A1 * | 6/2005 | Hudson | F28D 20/0056 60/659 |
| 2007/0209365 | A1 * | 9/2007 | Hamer | F28F 21/02 60/648 |
| 2011/0162829 | A1 * | 7/2011 | Xiang | F28C 3/005 165/234 |
| 2011/0296826 | A1 * | 12/2011 | Pinto, IV | F03G 7/065 60/527 |
| 2014/0127599 | A1 | 5/2014 | Kachi | |
| 2018/0108956 | A1 | 4/2018 | Fortenbacher | |
| 2019/0219339 | A1 * | 7/2019 | Cave | F28D 19/047 |
| 2019/0379061 | A1 | 12/2019 | Taylor | |
| 2021/0010758 | A1 * | 1/2021 | Chopard | F28D 20/028 |
| 2021/0143446 | A1 * | 5/2021 | Ponec | F24V 30/00 |
| 2022/0170388 | A1 * | 6/2022 | O'Donnell | C25B 9/23 |

FOREIGN PATENT DOCUMENTS

| | | | |
|---|---|---|---|
| DE | 102010028726 A1 | 11/2011 | |
| ES | 2610628 A1 * | 4/2017 | |
| FR | 2811744 A1 * | 1/2002 | ........... F24H 7/0408 |
| GB | 2516453 A | 1/2015 | |
| KR | 100709857 B1 * | 4/2007 | |
| KR | 100709857 B1 | 4/2007 | |
| WO | 9114906 A1 | 10/1991 | |
| WO | 2016050368 A1 | 4/2016 | |
| WO | 2020254001 A1 | 12/2020 | |

OTHER PUBLICATIONS

Amy, C., et al., "Thermal energy grid storage using multi-junction photovoltaics," Energy Environ. Sci., 2019, 12, 334.

Datas, A., et al., "Amadeus: Next generation materials and solid state devices for ultra high temperature energy storage and conversion," AIP Conference Proceedings 2033, 170004 (2018); http://doi.org/10.1083/1.5067160; published online: Nov. 8, 2018.

Datas, A., et al., "Ultra high temperature latent heat energy storage and thermophotovoltaic energy conversion," Energy, 107 (2016) 542-549, Elsevier.

* cited by examiner

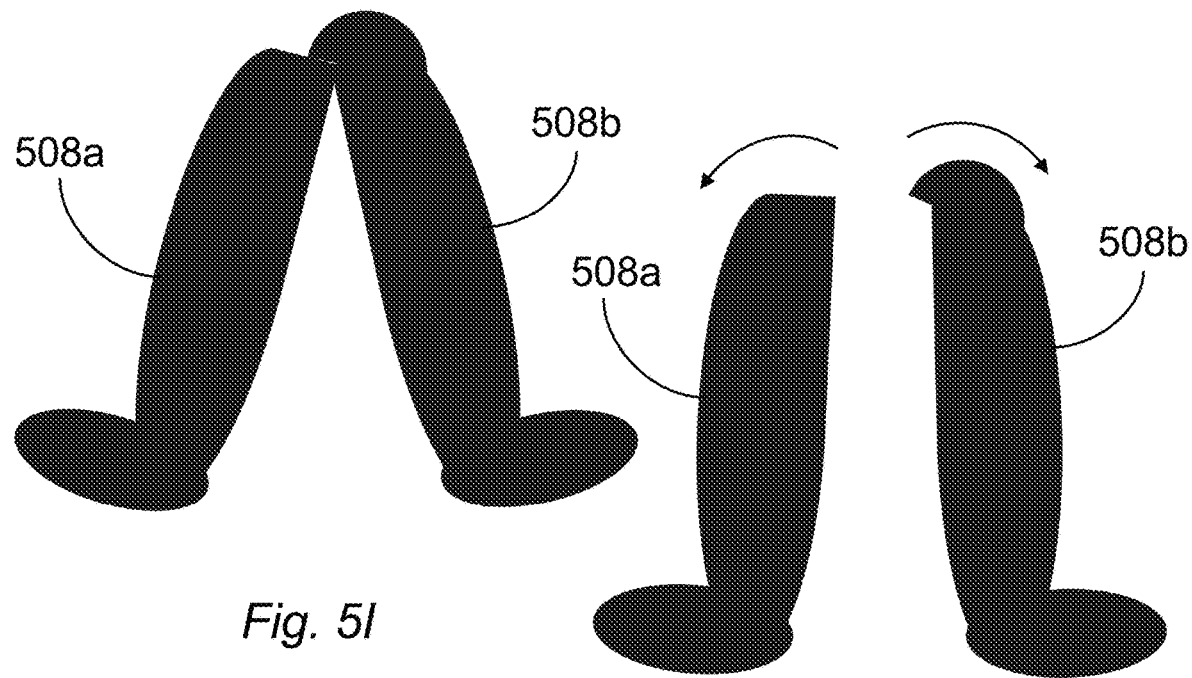
Fig. 5I
Fig. 5J
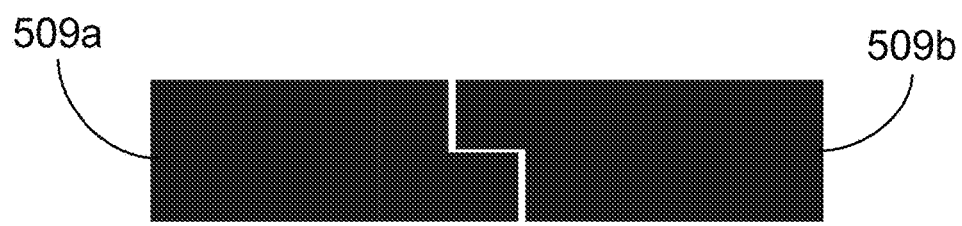
Fig. 5K
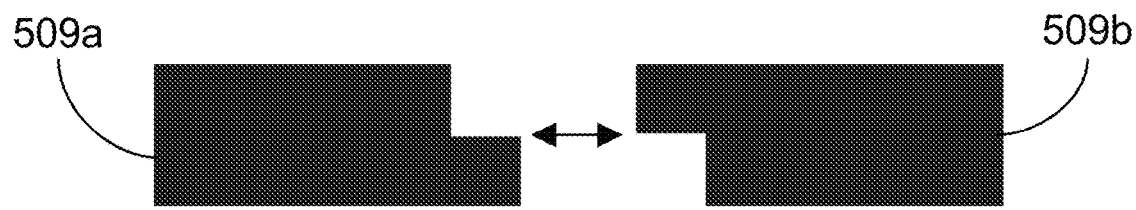
Fig. 5L

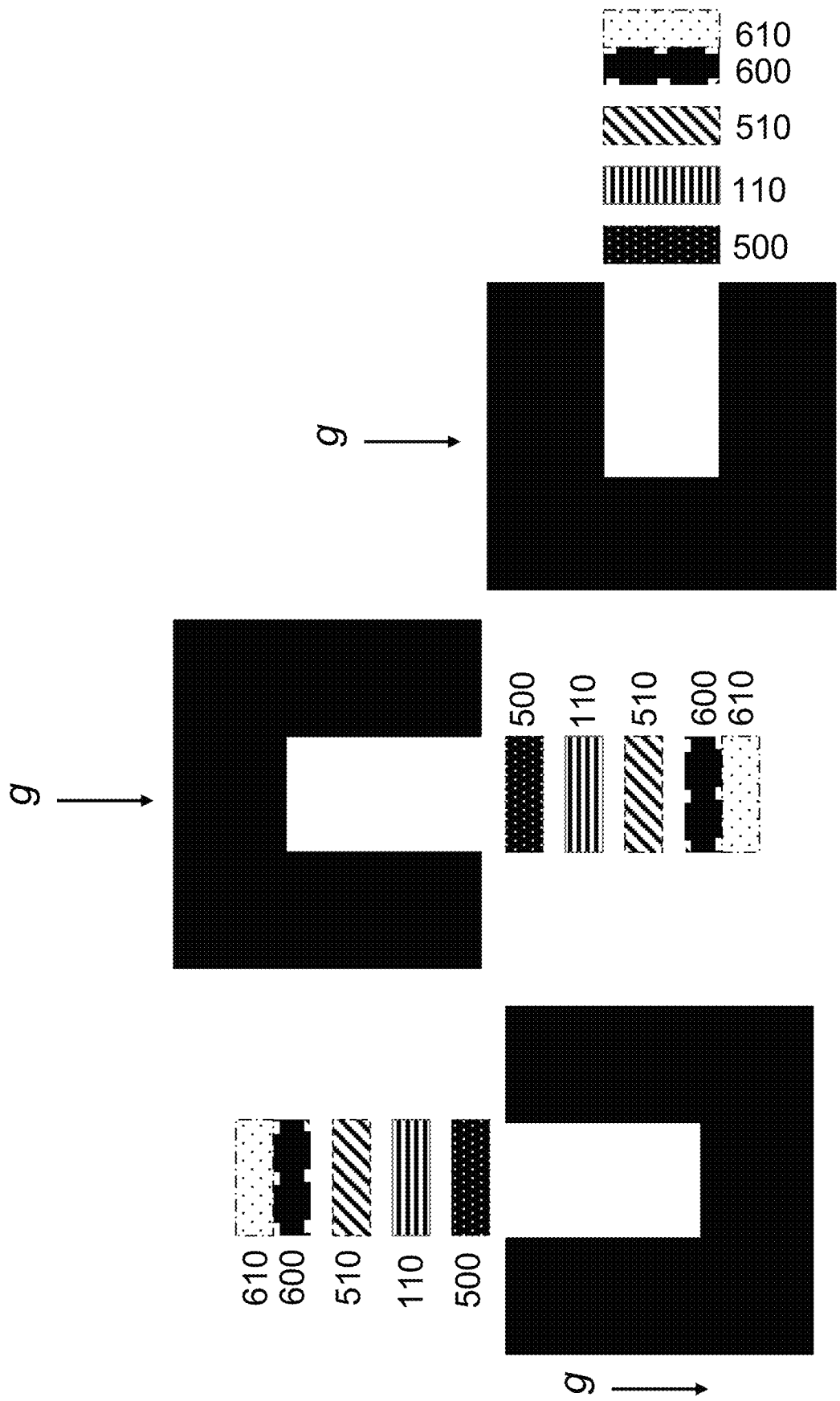

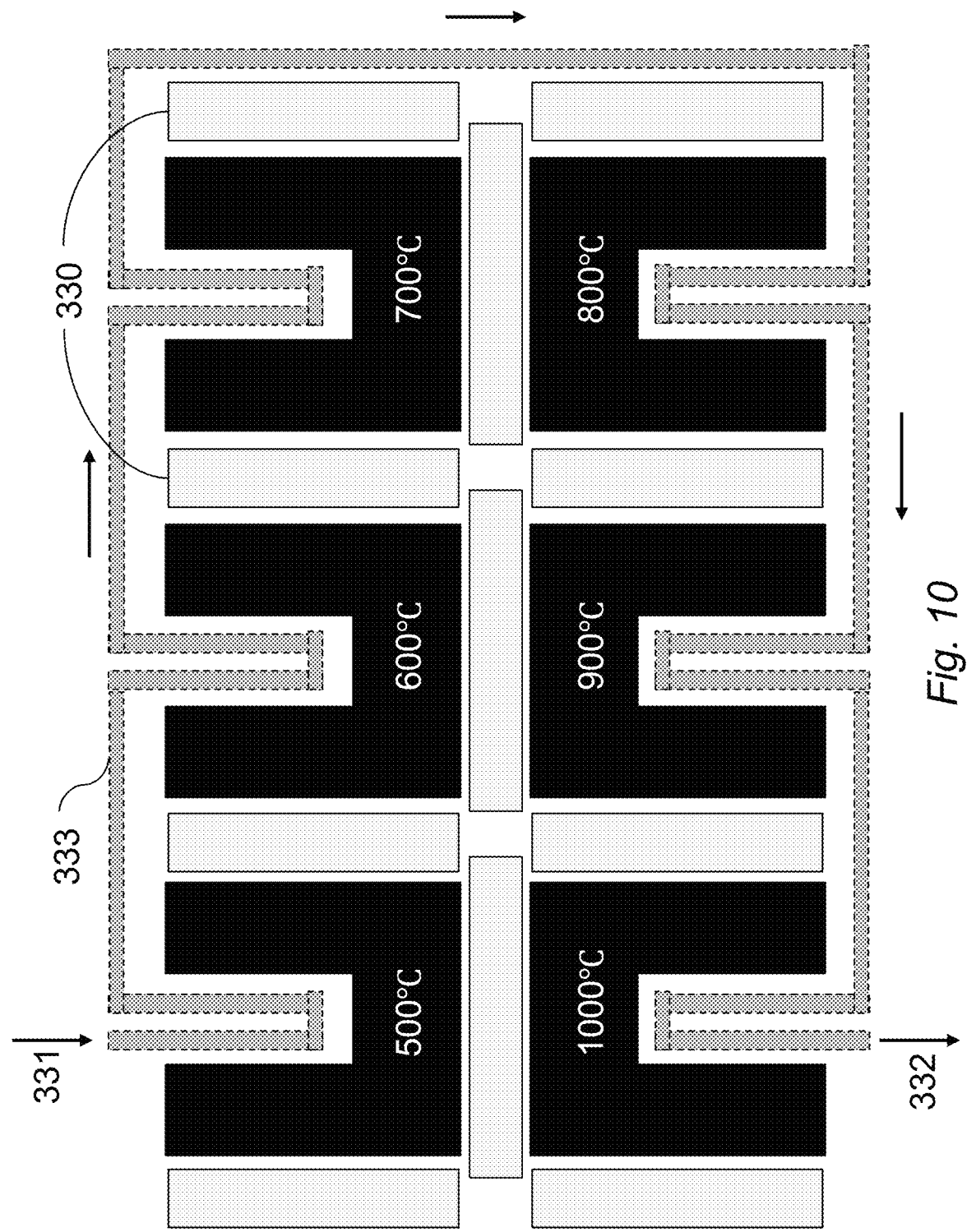

SYSTEMS FOR MANAGING THERMAL ENERGY WITHIN A THERMAL STORAGE SOLUTION

CROSS-REFERENCE TO RELATED APPLICATIONS

This application claims the benefit of U.S. Provisional Patent Application No. 63/215,404 entitled Sub-Systems and Methods Within a Solid-State Thermal Battery," filed Jun. 25, 2021, the contents of which are hereby incorporated by reference in their entirety.

TECHNICAL FIELD

The present disclosure relates to the field of large capacity energy storage. More specifically, the embodiments set forth below describe the sub-systems and methods within a thermal storage solution.

BACKGROUND OF INVENTION

The transition to renewable energy, such as wind and solar energy, is giving rise to an increased demand for large-scale energy storage solutions that can be deployed in the grid. There is a growing demand for energy storage solutions for capturing excess energy when energy production outpaces energy demand and for supplying energy when energy demand exceeds energy production. Existing battery technologies are improving, but have limits such as: material sourcing challenges, high cost, and performance limitations. An affordable and scalable solution to address the technical requirements does not exist in the current market.

Thermal energy storage is one type of energy storage that has faced two significant challenges. Thermal energy storage refers to a manner of storing excess energy as heat in some type of storage medium. Conventional thermal energy storage systems pump a liquid or gas storage medium through a network of pipes and heat exchangers to bring heat to a heat engine via convection and conduction. This transport of liquid or gas is faced with numerous problems and risks. Research into solid storage mediums has faced other challenges. If heat is extracted, typically via conduction, from the surface of a storage medium faster than the heat can conduct through the internal volume of the storage medium, a large thermal gradient can develop, which can leave large portions of the storage medium undischarged and creates the potential for a thermal-shock induced mechanical failure.

Thus, improved sub-systems and methods within a thermal storage solution are desirable.

BRIEF SUMMARY

A system and method are disclosed for charging and discharging a solid-state thermal storage solution. A system for storing energy may include an insulated container comprising a thermal storage medium; a heating element configured to heat the thermal storage medium; a heat receiving unit configured to receive heat being discharged by the thermal storage medium; and a mechanism configured to control an amount of heat being received by the heat receiving unit. In some examples, the heating element is configured to heat the thermal storage medium using thermal radiation. In some examples, the heating element is configured to heat the thermal storage medium using conduction. In some examples, the heating element is configured to heat the thermal storage medium using induction. In some examples, the heating element is configured to heat the thermal storage medium using radio frequency. In some examples, the radio frequency comprises a microwave. In some examples, the heating element is configured to heat the thermal storage medium by passing electrical current through the thermal storage medium, thereby increasing the temperature of the thermal storage medium through Joule heating. In some examples, the heating element is configured to heat the thermal storage medium using arc heating. In some examples, the heating element is configured to heat the thermal storage medium using plasma heating. In some examples, the heating element is configured to heat the thermal storage medium using laser heating. In some examples, the heating element is configured to apply heat radiatively to a surface of the thermal storage medium. In some examples, the surface defines a side of a trough or slot of the thermal storage medium.

In some examples, the system also may include an electrode coupled to the heating element. In some examples, the electrode is removably coupled to the heating element. In some examples, the system also may include a thermal insulating cap removably coupled to the electrode, wherein the electrode is permanently coupled to the heating element. In some examples, the system also may include a charging coupler removably coupled to the electrode. In some examples, the heat receiving unit may comprise a pipe system configured to transport a fluid medium, the pipe system comprising a length of pipe within radiative range of a surface of the thermal storage medium, the fluid medium configured to transport heat energy from the thermal storage medium to be converted into usable heat energy. In some examples the surface of the thermal storage medium may be located in a trough or slot of the thermal storage medium.

In some examples, the mechanism is configured to control a view factor between the thermal storage medium and the heat receiving unit. In some examples, the mechanism comprises a mechanical interface comprising a louver. In some examples, the mechanism comprises a mechanical interface comprising a concentric plate. In some examples, the mechanism comprises a mechanical interface comprising a slot plate. In some examples, the mechanism comprises a material configured to cause a given temperature drop across its thickness. In some examples, the mechanism comprises a re-radiator. In some examples, the heat receiving unit comprises a thermophotovoltaic (TPV) heat engine.

A system for storing energy may include: a container comprising a plurality of thermal storage media, each thermal storage medium comprising a trough or slot; a heating element associated with each thermal storage medium, the heating element configured to heat the each thermal storage medium; a heat receiving unit, the heat receiving unit configured to convert heat into electric energy; an insulation placed between a first surface of one of the plurality of thermal storage media and a second surface of a neighboring insulated container, the first surface facing the second surface, each thermal storage medium being insulated from a neighboring storage media in the container; and a mechanism, the mechanism configured to control a view factor between the thermal storage medium and the heat receiving unit.

In some embodiments, the thermal storage medium comprises an array of blocks arranged in a pattern such that one or more troughs are defined in the negative space in the blocks or block arrangement. In an embodiment, the solid-state thermal storage solution is discharged via the trough surface radiating to at least one or more heat engines or one or more view factor mechanisms, which then radiate to one or more heat engines.

In some embodiments, the thermal storage medium is heated via thermal radiation, conduction, induction, or radio frequency, such as microwave. In some embodiments, the heating is applied radiatively to the surface of the thermal storage medium, including the trough. In other embodiments, the heating is applied conductively to the thermal storage medium.

In some embodiments, the electrodes of the heating elements are mechanized so that they can be inserted and extracted into and out of the hot thermal storage medium environment. In other embodiments, a charging coupler can attach and detach to an electrode embedded within the thermal storage medium while another mechanism can thermally shield the hot electrode from the remainder of the system.

In some embodiments, the heat engine employs the use of thermophotovoltaics (TPV) to convert the heat into electric energy. In other embodiments, the heat receiving unit employs the use of water, steam, oil, and/or air to transport the thermal storage medium heat into usable heat energy.

In some embodiments, the thermal storage solution has one or more mechanical interfaces between the thermal storage medium and the heat engine to dynamically control or throttle the power radiated from the thermal storage medium received by the heat receiving unit.

In some embodiments, one or more gases is regularly or constantly flowing across the surface of the heat engine to reduce or prevent particles or condensable gases in the thermal storage solution atmosphere depositing onto the heat engine. In other embodiments, one or more gases are flowing across the surface of the heat engine to remove particles in the thermal storage solution atmosphere that have deposited onto the heat engine. In other embodiments, one or more gases are flowing in proximity to the heat engine to create a positive pressure environment to reduce or prevent particles in the thermal storage solution atmosphere depositing onto the heat engine. In other embodiments, one or more gases of different densities are used to isolate the thermal storage solution atmosphere from the heat engine atmosphere.

In some embodiments, the heat receiving unit resides on the inner ceiling of the thermal storage solution. In other embodiments, the heat receiving unit resides on the inner side wall of the thermal storage solution. In other embodiments, the heat receiving unit resides on the inner floor of the thermal storage solution.

In some embodiments, the thermal storage solution is composed of enclosed unit cells that are thermally isolated from each other. These isolated cells enable numerous operational cases and optimize system costs.

In some embodiments, the system includes a stationary thermal storage medium that can be charged by adding heat to the thermal storage medium. A heat receiving unit can be utilized to discharge the thermal storage solution, converting the heat stored in the thermal storage medium into electricity and/or thermal heat. The heat receiving units or interstitial mechanisms are actuated in a manner that reduces thermal gradients in the thermal storage medium to increase the efficiency of the system. In one embodiment, the thermal storage medium is contained in a main chamber of an insulated container. The heat receiving units are stored, when idle, in an ancillary chamber adjacent to the main chamber and are exposed to the main chamber and/or interstitial mechanisms by an actuation system to begin discharging the thermal storage solution. The thermal storage solution control system dynamically adjusts the power radiated by the thermal storage medium and absorbed by the heat receiving units to reduce thermal gradients induced therein and for greater control of a power output of the thermal storage solution.

In some embodiments, a thermal storage solution may include a thermal storage medium, a heat receiving unit, and a mechanism configured to control an amount of heat received by the heat receiving unit, the thermal storage solution being configured in a radially symmetric design with the thermal storage medium at or near the core or center of the system and the heat receiving unit forming an outer cylindrical structure of the system. In other examples, a different radially symmetric configuration may include a thermal storage medium forming an outer cylindrical structure and a heat receiving unit at or near the core or center of the system.

BRIEF DESCRIPTION OF THE DRAWINGS

Various non-limiting and non-exhaustive aspects and features of the present disclosure are described hereinbelow with references to the drawings, wherein:

FIGS. 5A-5L are diagrams of exemplary throttling mechanical interfaces between a thermal storage medium and a heat receiving unit, in accordance with one or more embodiments.

FIGS. 8A-8C are cross sectional views of exemplary gravitational orientations of a thermal storage medium and a heat receiving unit, in accordance with one or more embodiments.

FIG. 10 is a cross sectional view of multiple thermal storage medium trough block unit cells at different temperatures with heat exchanging pipes traversing through the unit cells, in accordance with one or more embodiments.

Like reference numbers and designations in the various drawings indicate like elements. Skilled artisans will appreciate that elements in the Figures are illustrated for simplicity and clarity, and have not necessarily been drawn to scale, for example, with the dimensions of some of the elements in the figures exaggerated relative to other elements to help to improve understanding of various embodiments. Common, well-understood elements that are useful or necessary in a commercially feasible embodiment are often not depicted in order to facilitate a less obstructed view of these various embodiments.

DETAILED DESCRIPTION

The invention is directed to sub-systems and methods within a thermal storage solution. The Figures and the following description describe certain embodiments by way of illustration only. One of ordinary skill in the art will readily recognize from the following description that alternative embodiments of the structures and methods illustrated herein may be employed without departing from the principles described herein. Reference will now be made in detail to several embodiments, examples of which are illustrated in the accompanying figures.

The systems and methods described herein disclose a thermal storage solution that includes a stationary thermal storage medium that can be charged by adding heat to the thermal storage medium. Actuation of mechanisms and/or heat receiving units (e.g., heat engine, heat transfer fluid, an industrial process component) can be utilized to discharge a thermal storage solution, converting the heat stored in the thermal storage medium into electricity and/or thermal energy. In some examples, a heat receiving unit may comprise a heat engine (e.g., thermophotovoltaic (TPV) or other type of heat engine). In other examples, a heat receiving unit may comprise a thermal receiver configured to use a heat-transfer fluid to move heat from the heat receiving unit to another, external process that requires heat. In still other examples, a heat receiving unit may comprise a heat-driven process configured to gain beneficial use of the heat being discharged from the thermal storage medium. In yet other examples, a heat receiving unit may comprise a physical or chemical process that is driven by heat, where reactants are brought into the heat receiving unit, and products leave the heat receiving unit.

Figure 1A:
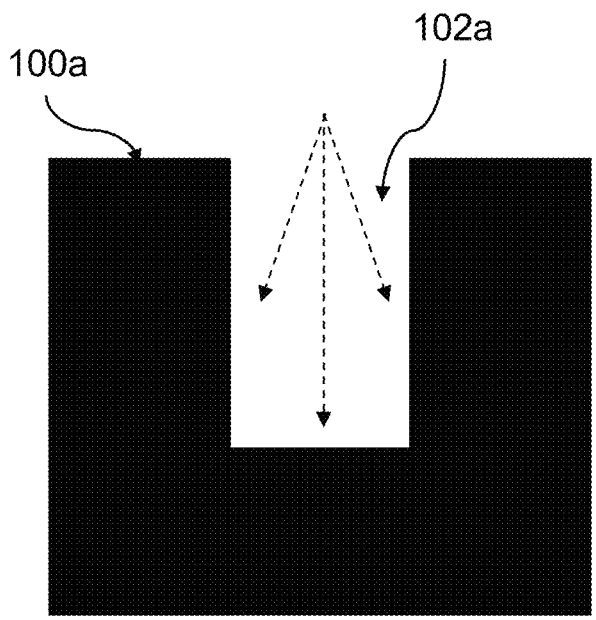
FIGS. 1A-1D are cross sectional views of exemplary thermal storage medium with a trough or slot configured for radiative thermal charging and discharging, in accordance with one or more embodiments.
Figure 1B:
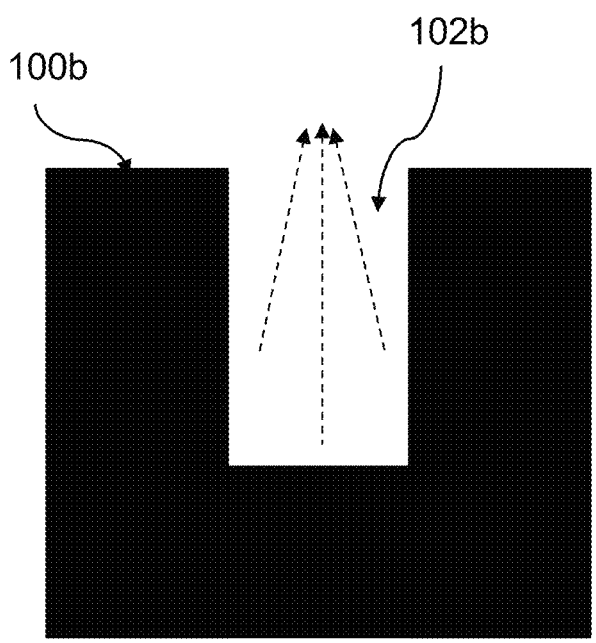
Figure 1C:
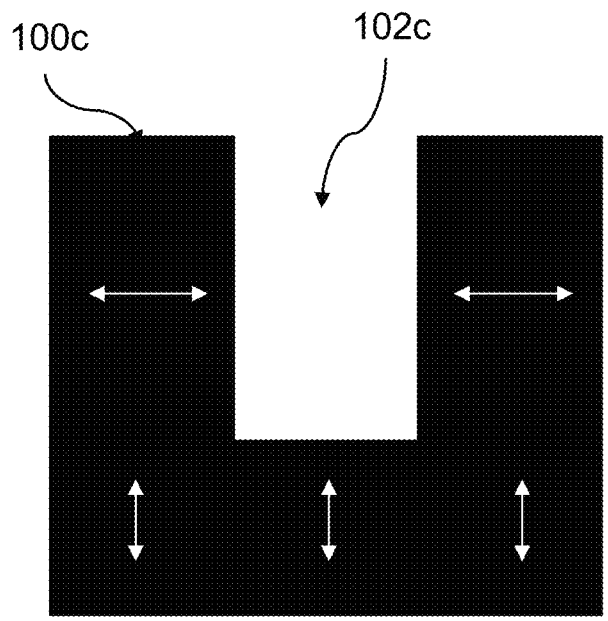
Figure 1D:
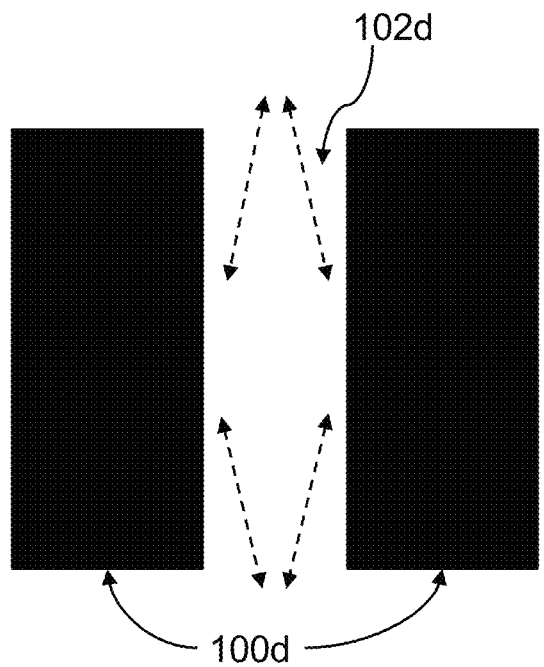

FIGS. 1A-1D are cross sectional views of exemplary thermal storage medium 100a-d with trough 102a-c and slot 102d (e.g., hallway-style opening or through space through a middle or other interior portion of thermal storage medium 100d) that enables a large surface area for radiative thermal charging (e.g., FIGS. 1A and 1D) and discharging (e.g., FIGS. 1B and 1D). A person of ordinary skill in the art will appreciate that trough 102a-c and slot 102d may take the form of any void space within or between portions of thermal storage medium 100a-d. In addition, trough 102a-c and slot 102d provide a thickness of material (as shown in FIGS. 1C and 1D) that can provide up to uniform conduction distance for thermal energy to transition from an interior of thermal storage medium 100a-d to a radiating surface of trough 102a-c or slot 102d (e.g., in a discharging scenario) or from a radiating surface of trough 102a-c and slot 102d to an interior of thermal storage medium 100a-c (e.g., in a charging scenario). In some examples, the thickness of material may be uniform or near-uniform across. As temperature increases, radiative heat transfer becomes much more powerful, and thus the thermal storage medium trough 102a-c and slot 102d has been modeled to demonstrate a higher equivalent thermal conductivity compared to some of the most conductive solid state materials, enabling radiative heat absorption by a heat receiving unit to balance that of conductive heat transfer from within thermal storage medium 100a-d to one or more radiating surfaces.

Figures 2A, 2B:
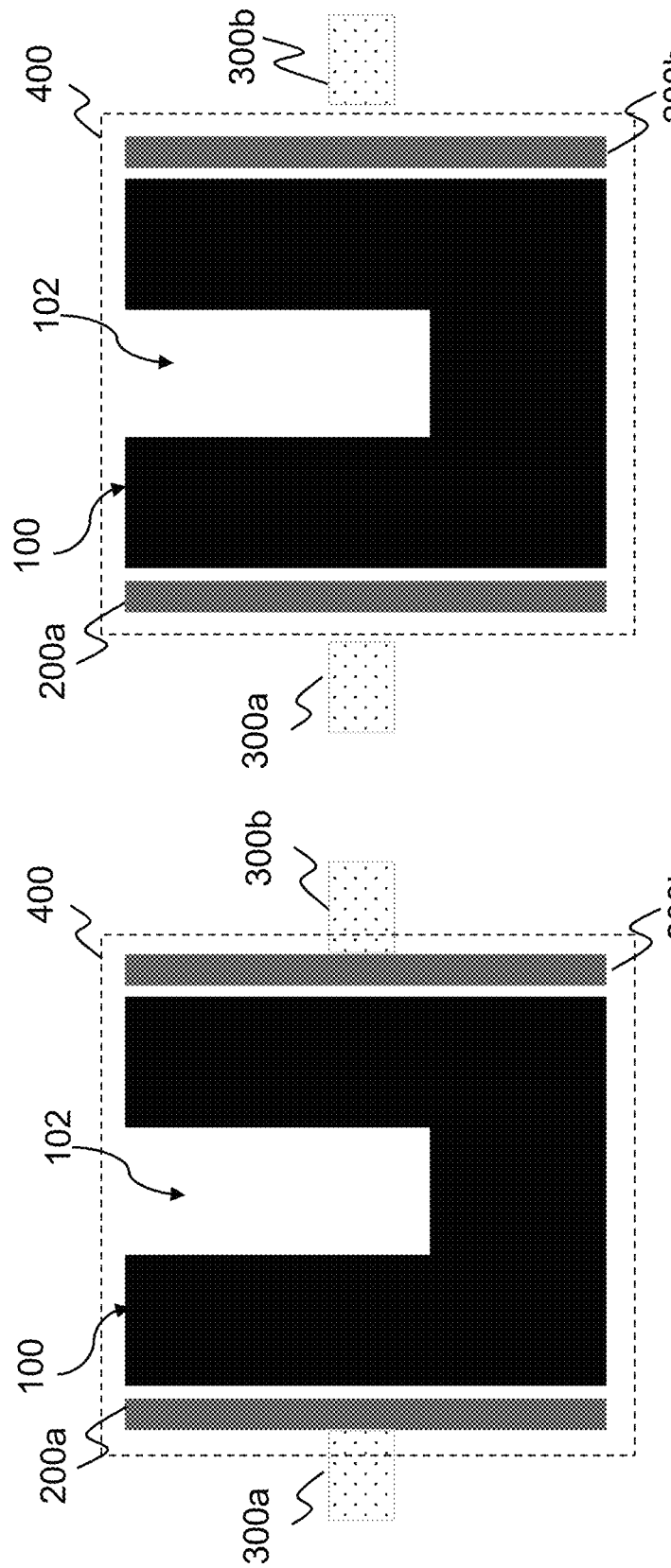
FIGS. 2A-2B are cross sectional view of exemplary electrodes coupled to heating elements for electrical charging and discharging, in accordance with one or more embodiments.

In some embodiments, charging a thermal storage solution can be performed using one, or a combination, of radiant heat from a heating element, laser heating, radio frequency (RF) heating, microwave heating, induction heating, and other non-contact methods. In FIGS. 2A-2B, thermal storage medium 100 is shown comprising trough 102, and with resistive heating elements 200a-b configured to radiate heat when electricity is conducted through them via electrodes 300a-b, which may be removably coupled to resistive heating elements 200a-b. While actively charging (e.g., in FIG. 2A), electrodes 300a-b may be actively cooled with water, or some other cooling material, to prevent damage (e.g., permanent, extensive, substantial, or otherwise) to electrodes 300a-b. When the thermal storage solution is charged to or above a threshold temperature (e.g., >1100° C., >1300° C., >1500° C., >2000° C., >2200° C., and other minimum temperature thresholds sufficient for a productive radiative heat transfer system) and resistive heating elements 200a-b are idling, a hot zone 400 area, including the thermal storage medium 100 and resistive heating elements 200a-b, is at the same or similar temperature. When electrodes 300a-b are coupled to resistive heating elements 200a-b, respectively, heat from hot zone 400 may be conducted back into electrodes 300a-b when the system is idling. Thus, to prevent damage to electrodes 300a-b when exposed to these temperatures, electrodes 300a-b may be actively cooled. However, the energy used to cool electrodes 300a-b when connected to resistive heating elements 200a-b and while the thermal storage solution (e.g., resistive heating elements 200a-b) is idling may result in parasitic energy losses. To prevent or diminish these losses, electrodes 300a-b may be configured to retract (i.e., uncouple or detach) from resistive heating elements 200a-b (as shown in FIG. 2B) when the thermal storage solution is idling (e.g., thermal storage medium 100 is charged to or above a threshold temperature, thermal storage medium 100 otherwise not being charged, and other circumstances wherein the charging system is idling).

Figure 3A:
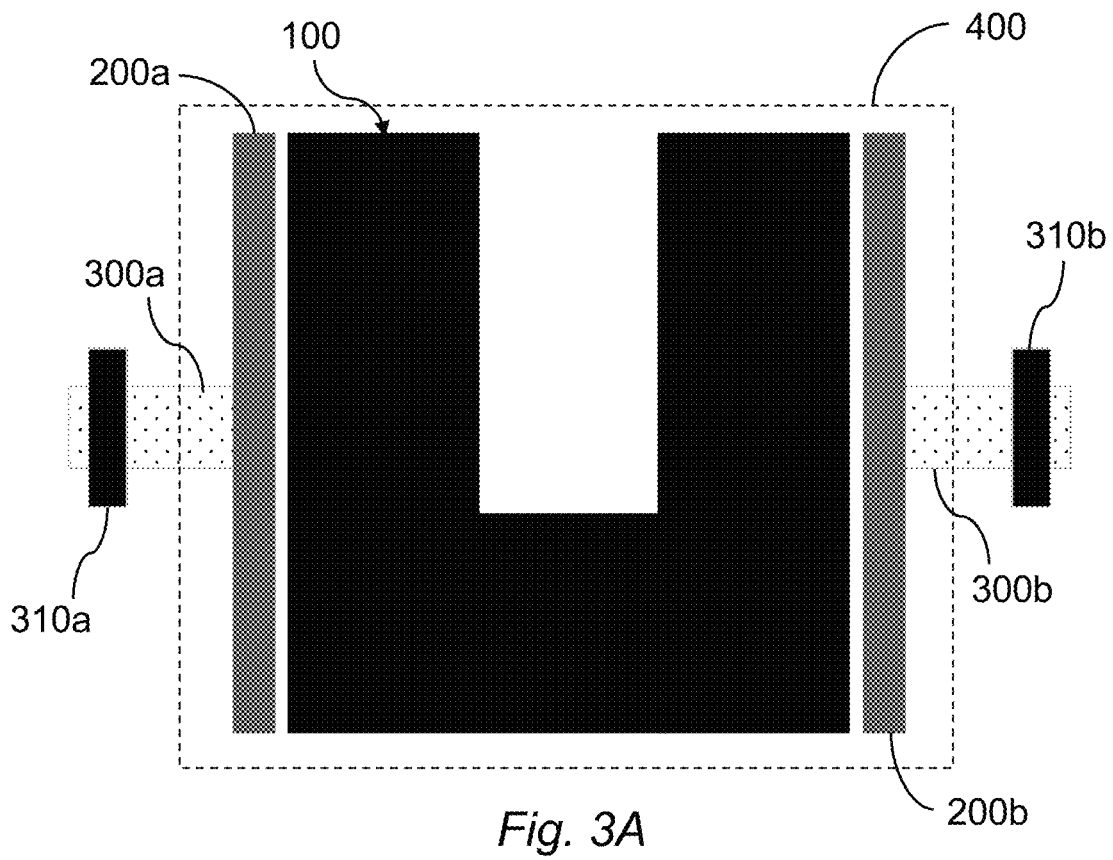
FIGS. 3A-3F are cross sectional views of alternative exemplary electrodes for electrical charging and discharging, in accordance with one or more embodiments.
Figure 3B:
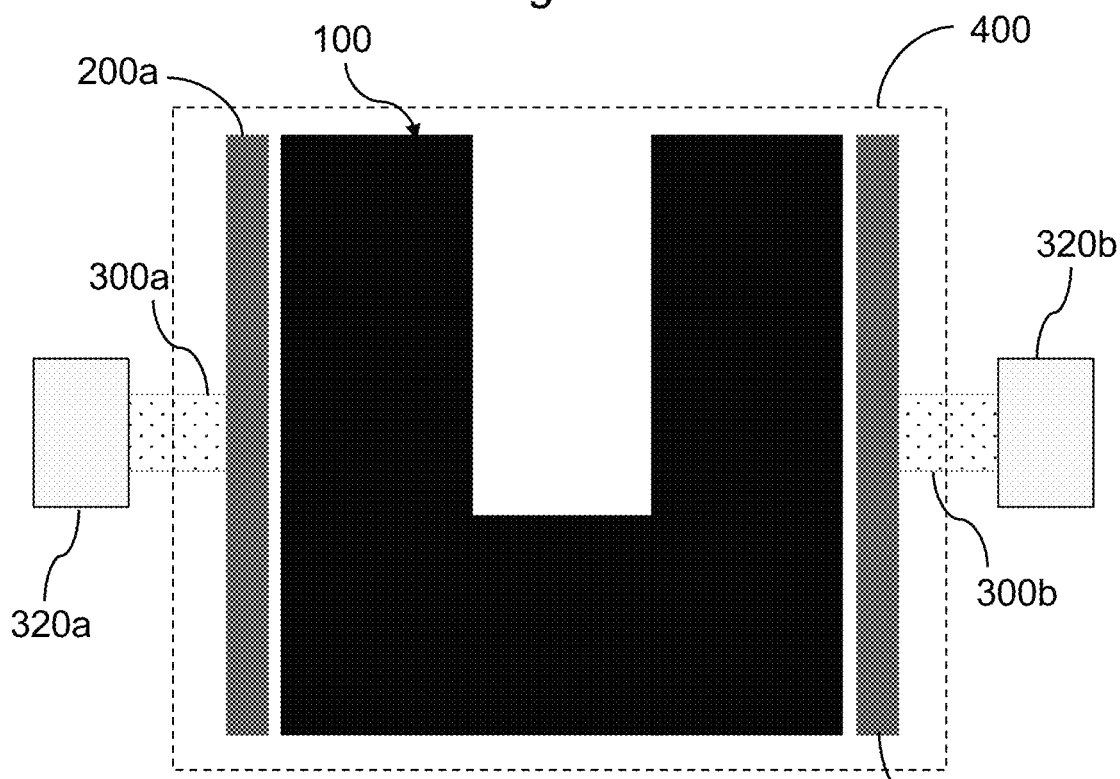

In other embodiments, FIGS. 3A-3F show cross sectional views of exemplary thermal storage medium 100 comprising electrodes 300a-b permanently coupled to resistive heating elements 200a-b. In some examples, to prevent parasitic energy losses when the thermal storage solution is idling as described above, thermal insulating caps 320a-b may be placed on electrodes 300a-b, as shown in FIG. 3B. In this example, charging couplers 310a-b may be disconnected. To charge the thermal storage solution, the thermal insulating caps 320a-b may be removed and charging couplers 310a-b may be (re)connected to electrodes 300a-b, respectively, as shown in FIG. 3A, electrodes 300a-b remaining coupled to the resistive heating elements 200a-b, respectively.

Figure 3C:
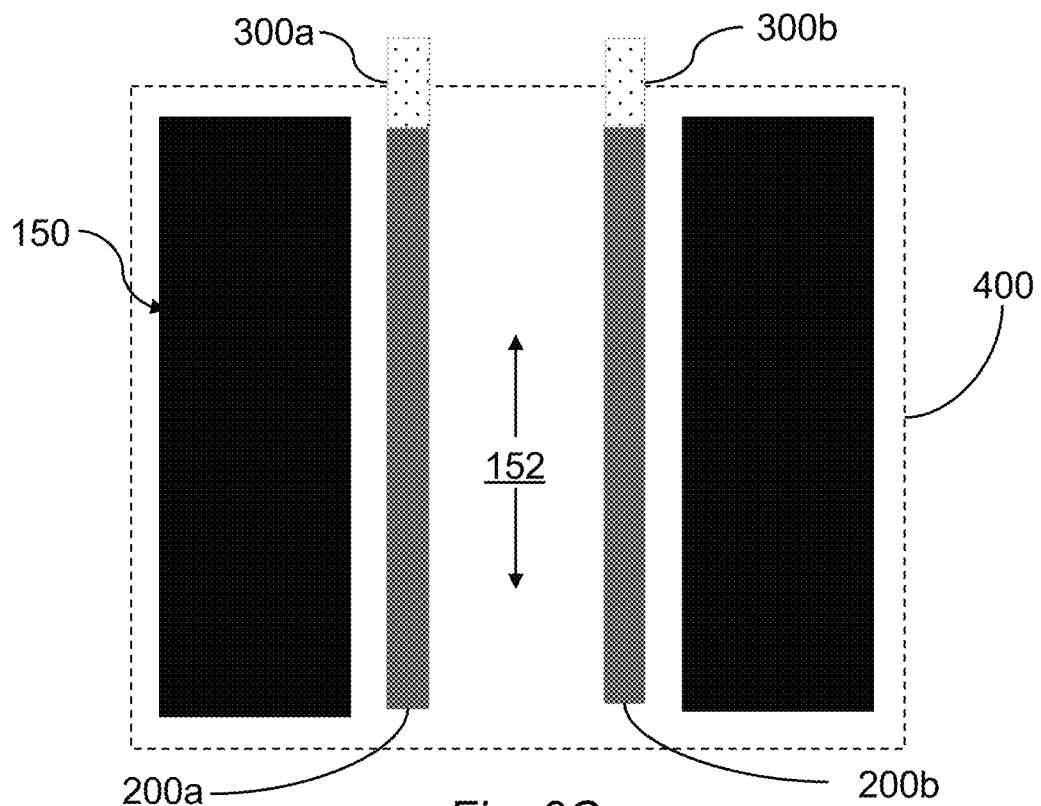
Figure 3D:
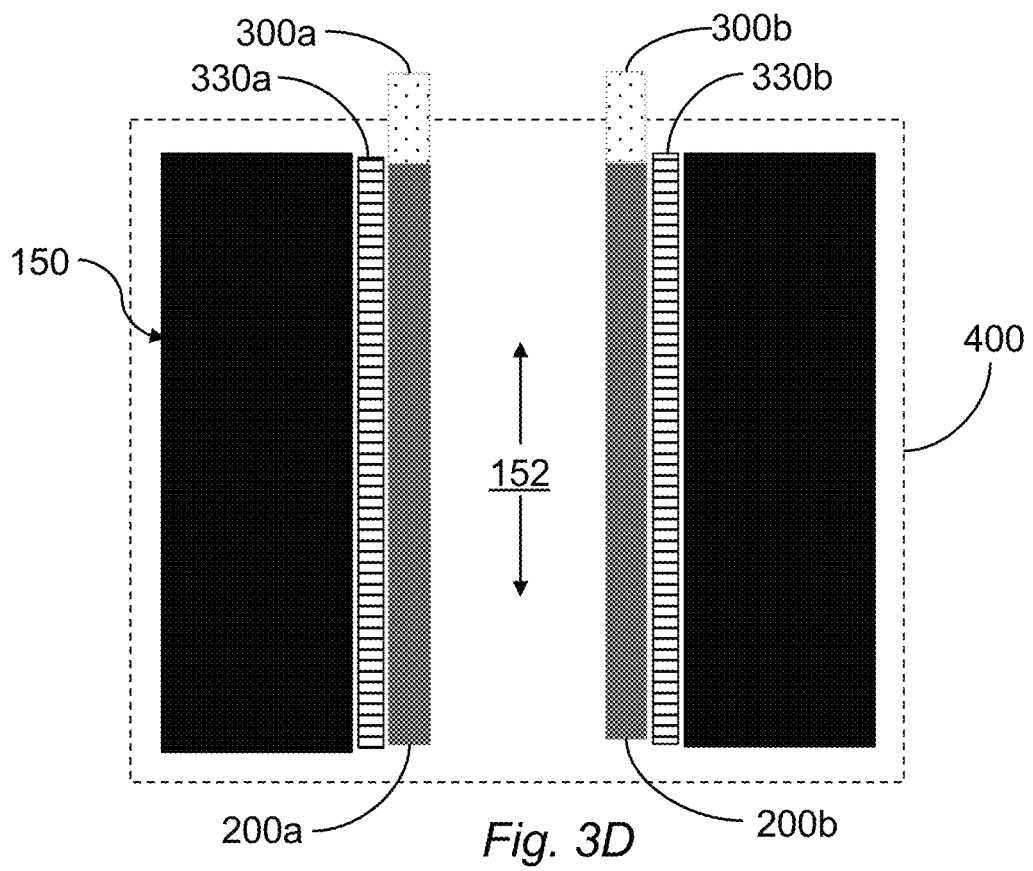

In FIGS. 3C-3D, heating elements 200a-b may be provided near an internal surface of thermal storage medium 150 and coupled to electrodes 300a-b. In this example, insulation 330a-b may be inserted (e.g., manually or automatically) between thermal storage medium 150 and heating elements 200a-b in order to prevent energy losses when the system is idling.

Figure 3E:
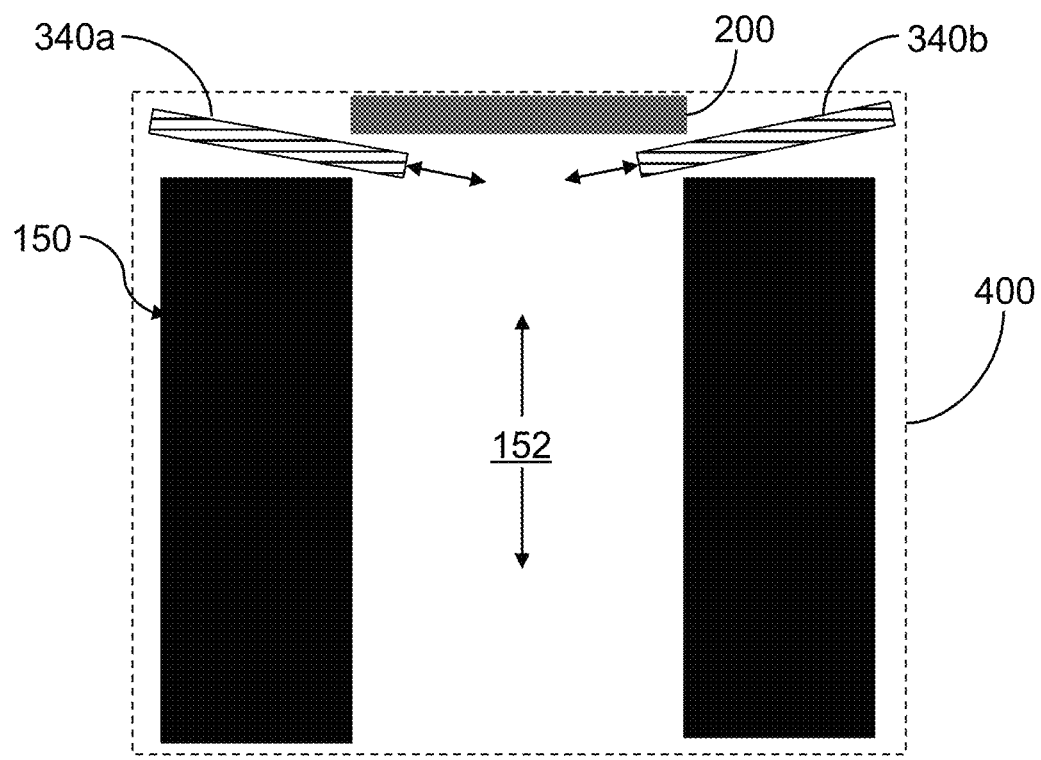
Figure 3F:
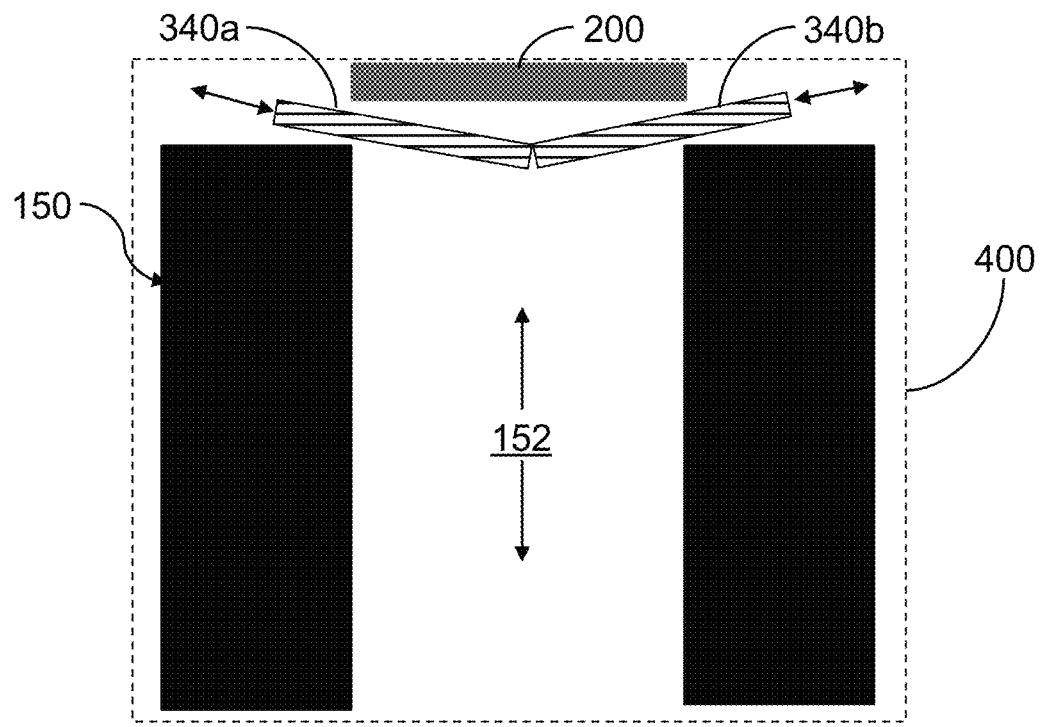

In FIGS. 3E-3F, heating element 200 may be provided at a top or bottom end, or side, of slot 152 of thermal storage medium 150. Shutters 340a-b may be deployed and retracted in the directions indicated by the double-sided arrows. When deployed, as shown in FIG. 3F, shutters 340a-b may be configured to shield heating element 200 from thermal storage medium 150 to prevent heat from storage medium 150 from leaking out of the thermal storage system through heating element 200 when heating element 200 is in an idle (e.g., cooled or cooling) state.

In some examples, heating elements 200a-b may be configured to heat thermal storage medium 100 using one, or a combination, of thermal radiation, conduction, induction, radio frequency (e.g., microwave), arc heating, plasma heating, laser heating, and passing electrical current through thermal storage medium 100 directly through Joule heating. Any of the structures described herein to change an amount of thermal power received by a discharge unit also may be deployed or otherwise used to limit heat leakage through heating elements, and vice versa.

Figure 4A:
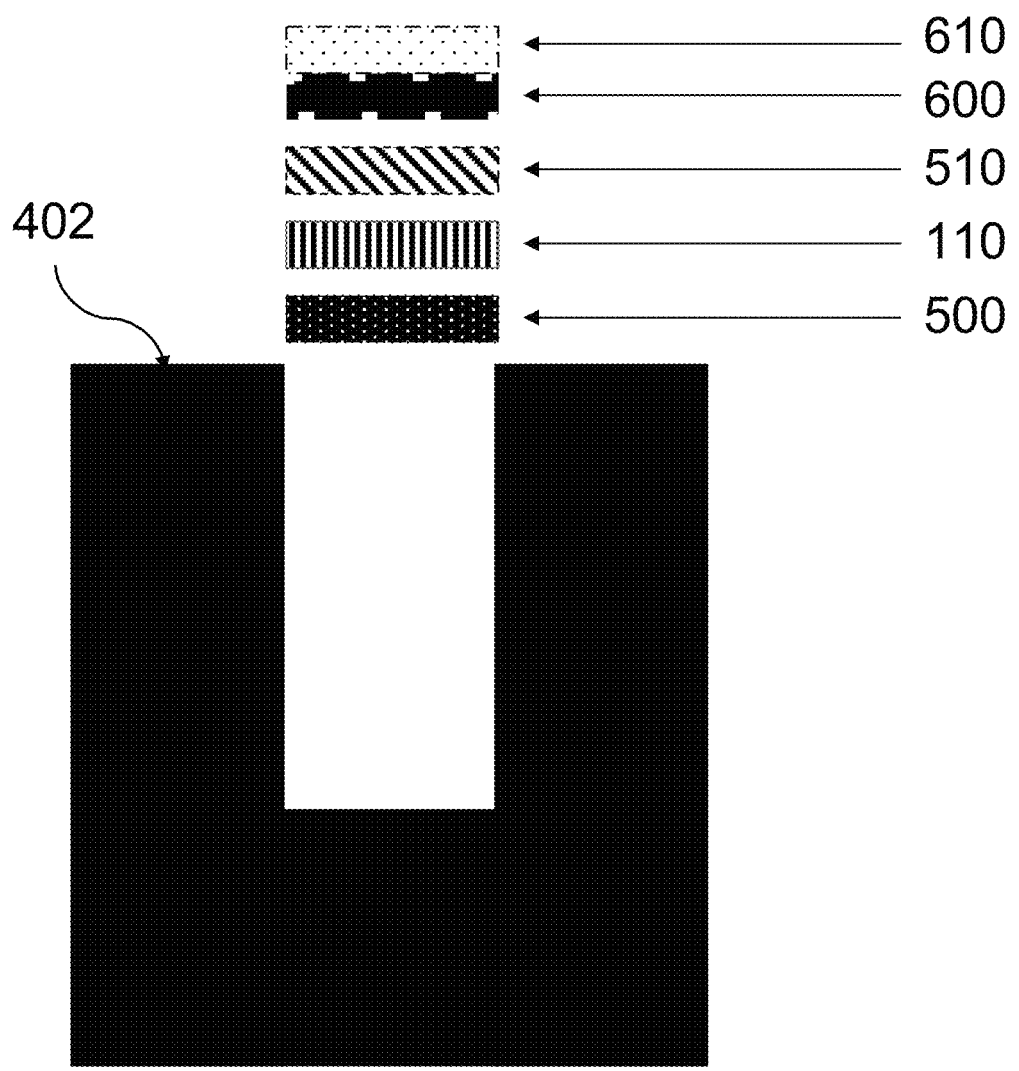
FIGS. 4A-4B are cross sectional views of an exemplary stack of mechanical interfaces between a thermal storage medium and a heat receiving unit, in accordance with one or more embodiments.
Figure 4B:
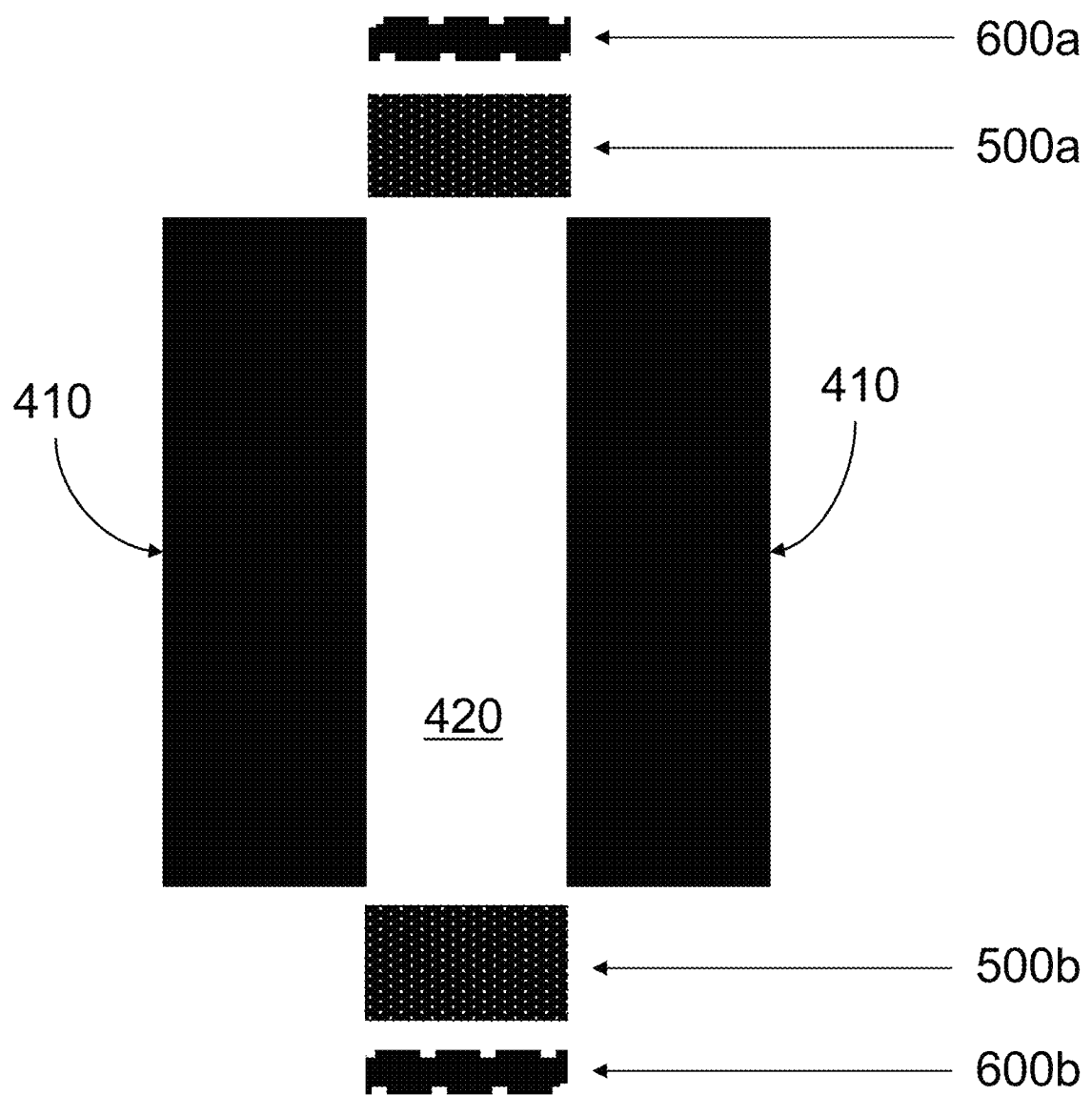

FIGS. 4A-4B are cross sectional views of various exemplary mechanical interfaces between the thermal storage medium 402 and a heat receiving unit 600 (e.g., TPV or other heat engine, heat transfer fluid, an industrial process component). In FIG. 4A, heat receiving unit 600 may be configured to use thermophotovoltaics to convert heat into electrical energy in some examples. In other examples, a heat transfer fluid or other industrial process component may be used to convert heat into electrical energy or drive a chemical or physical transformation in a material. For heat receiving unit 600, the electrical conversion efficiency is dependent on the temperature (i.e., Discharge Temp) of the radiating heat surface. Once the radiating heat surface temperature deviates up or down from a threshold Discharge Temp, the heat receiving unit 600 efficiency decreases. As the thermal storage solution requires the thermal storage medium 402 to be charged to a higher temperature (e.g., a Charge Temp or other threshold temperature) and discharged down to the Discharge Temp, mechanical interfaces between the thermal storage medium 402 and the heat receiving unit 600 are required to control (e.g., throttle, buffer) an amount of heat and/or light (i.e., power) received by the heat receiving unit 600 from the thermal storage medium 402. Through a combination of a re-radiator 110 and a throttle 500, the temperature of re-radiator 110 can be maintained at the threshold Discharge Temp by dynamically controlling the throttle 500 even while the thermal storage medium 402 temperature is between the Charge Temp and the threshold Discharge Temp. Once the thermal storage medium 402 temperature reaches the Discharge Temp, the thermal storage solution is effectively discharged for the given rated power.

In some examples, to rapidly stop the thermal storage solution from discharging, due to either intentional or unintentional (e.g., safety or emergency) actions, a binary shutter 510 also can be inserted between the heat receiving unit 600 and other components (e.g., re-radiator 110, throttle 500, and thermal storage medium 100), to quickly stop the heat receiving unit 600 from absorbing additional heat. In some examples, a cooling plate 610 or other cooling solutions may be included in the thermal storage solution.

In FIG. 4B, one or more throttling mechanisms 500a-b and heat receiving units 600a-b may be provided at each end of slot 420 of thermal storage medium 410. Throttling mechanisms 500a-b may be structured and function the same or similarly to throttle 500, and heat receiving units 600a-b may be structured and function the same or similarly to heat receiving units 600, as described herein.

Figure 5A:
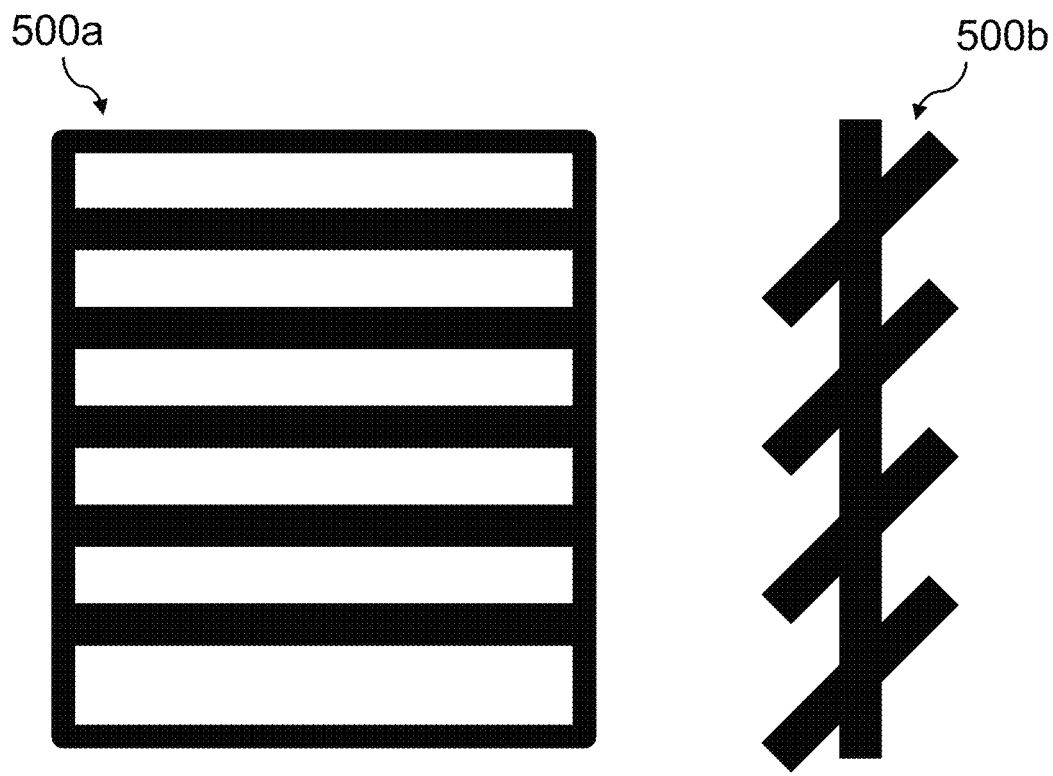
Figure 5B:
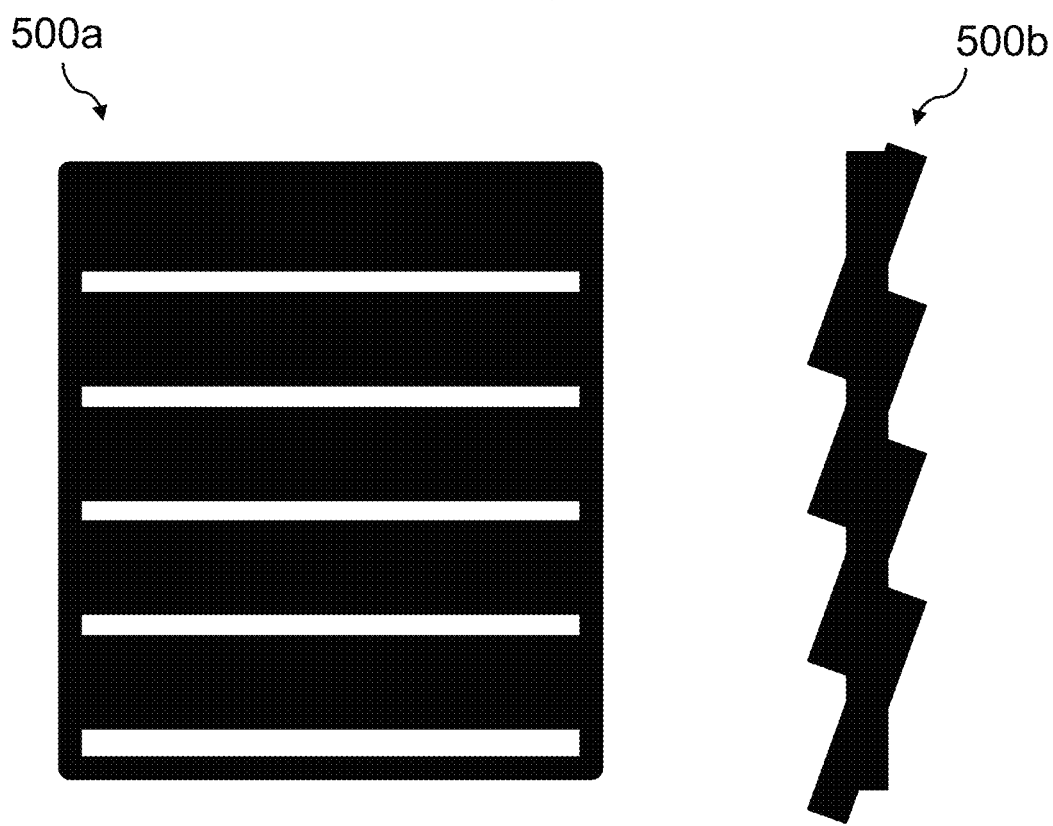
Figure 5C:
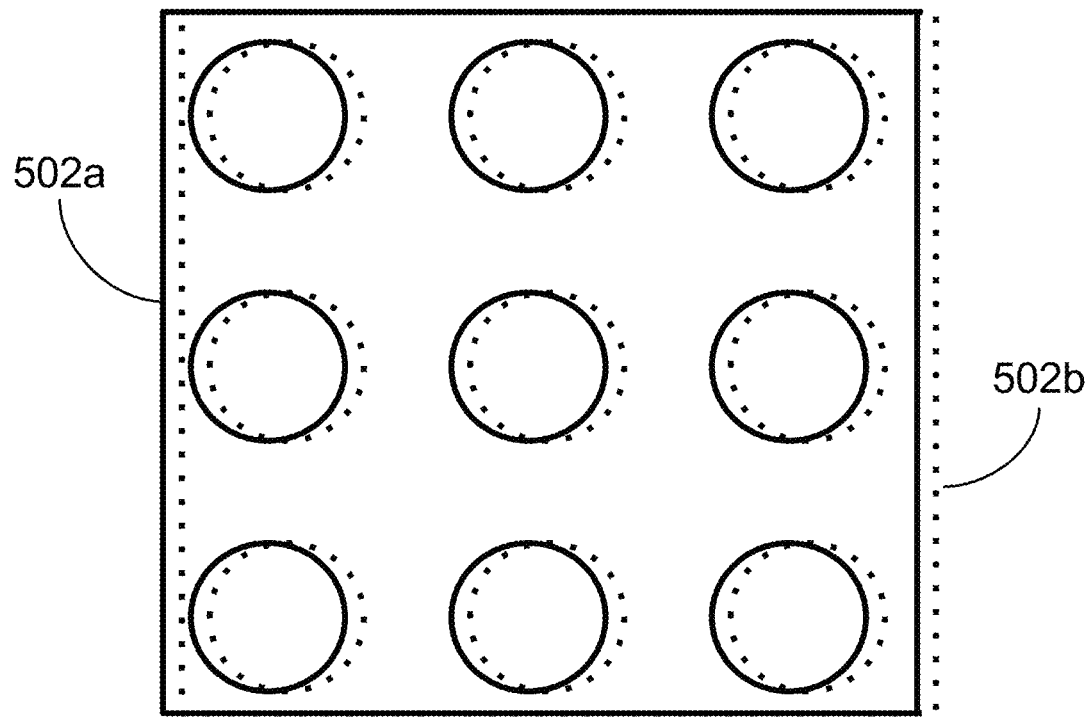
Figure 5D:
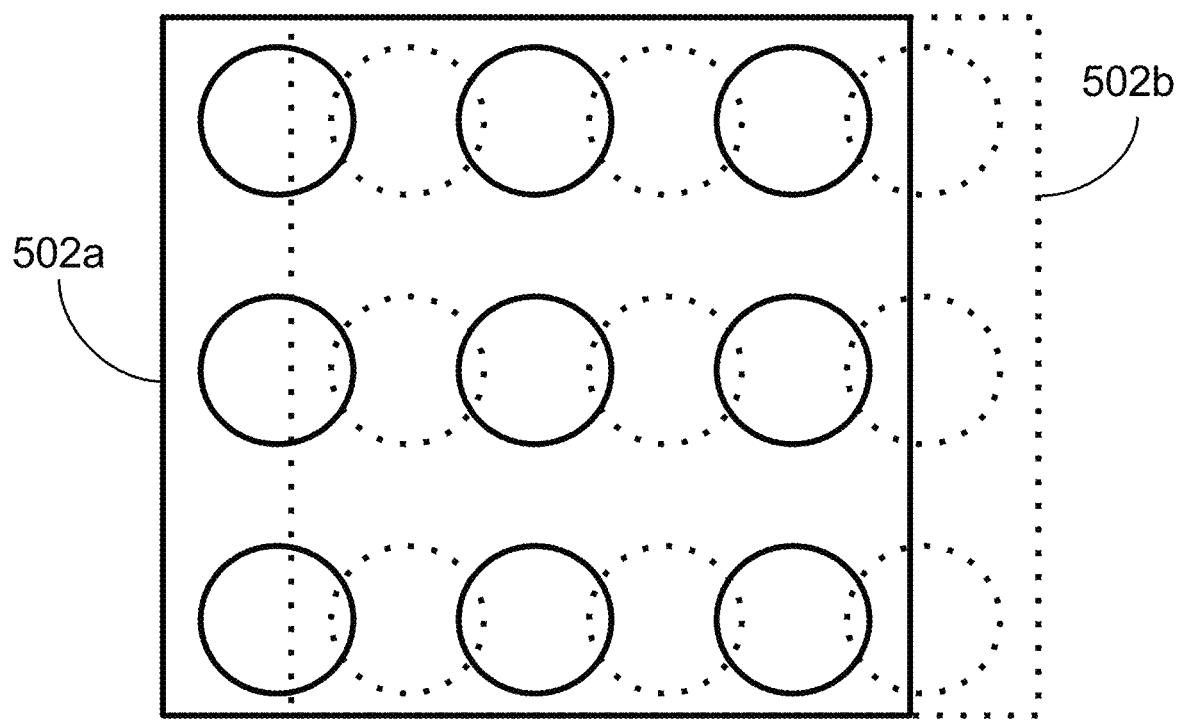
Figure 5E:
Figure 5F:
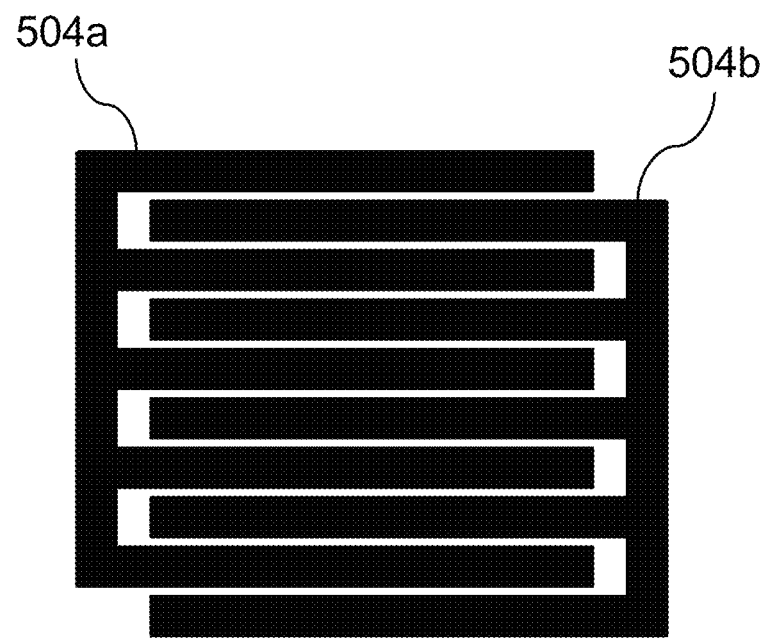

FIGS. 5A-5L represent various mechanical configurations of the throttle 500 and/or throttling mechanisms 500a-b. One embodiment to control the temperature of the re-radiator 110 or the thermal power transferred to the heat receiving unit 600a-b with the throttle 500 is to adjust the viewable area (i.e., view factor) of the thermal storage medium 100 to the re-radiator 110 or to the heat receiving unit 600a-b. These throttles 500 and/or throttling mechanisms 500a-b can be achieved by systems such as louvers (shown in FIGS. 5A-5B), overlapping concentric plates (shown in FIGS. 5C-5D), overlapping slot plates (shown in FIGS. 5E-5F), or similar mechanical structures. In an embodiment, FIGS. 5A-5B each show a front view (i.e., 500a) and a side view (i.e., 500b) of throttle 500, with louvers in a more open position in FIG. 5A and a more closed position in FIG. 5B. In another embodiment, FIG. 5C shows concentric plates 502a-b in a more closed (e.g., more overlapping) position, and FIG. 5D shows concentric plates 502a-b in a more open (e.g., less overlapping) position. In still another embodiment, FIG. 5E shows slot plates 504a-b in a more open (e.g., less overlapping) position, and FIG. 5F shows slot plates 504a-b in a more closed (e.g., more overlapping) position.

Alternative throttles 500 and throttling mechanisms 500a-b may include doors or door-like structures that open and close, as shown in FIGS. 5I-5L. In FIGS. 5I-5J, doors 508a-b may be rotated in opposing directions in order to open (FIG. 5J) or close (FIG. 5I). In FIGS. 5K-5L, doors 509a-b may be configured to slide in opposing directions in order to open (FIG. 5K) or close (FIG. 5L). As those skilled in the art will appreciate, these throttles and throttling mechanisms may be configured to open more or less than shown in FIGS. 5I-5L, and to be closed more completely than shown in FIGS. 5I-5L.

Figure 5G:
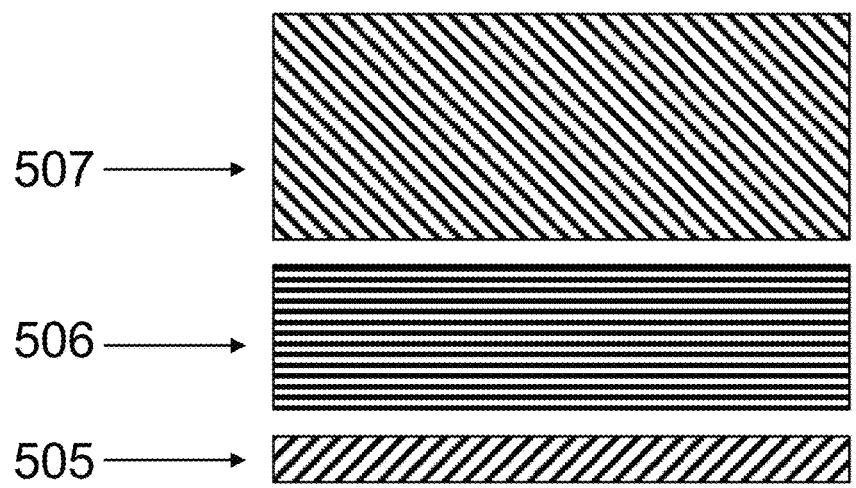
Figure 5H:
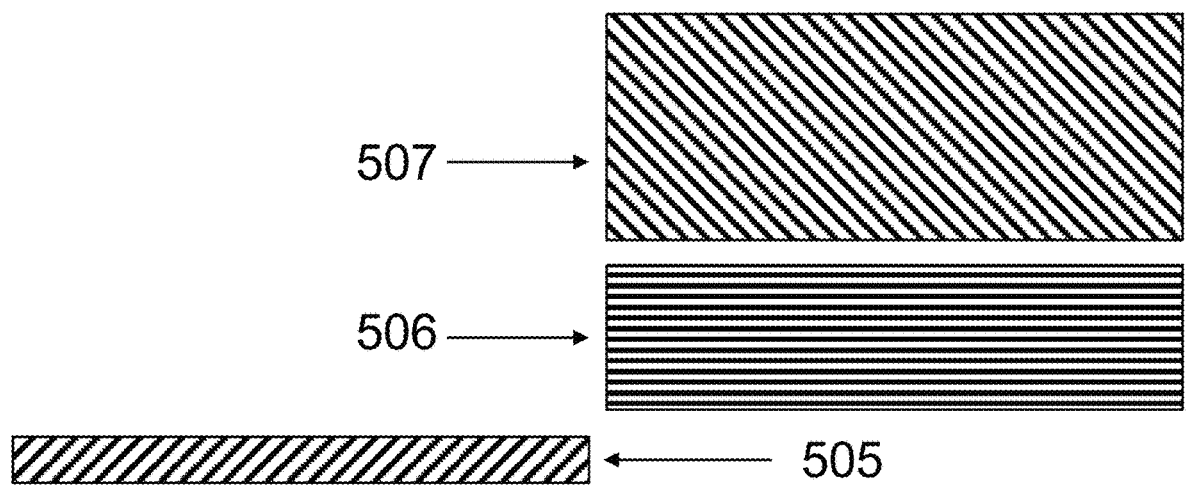

Another embodiment to control the temperature of the re-radiator 110 with the throttle 500 is to include materials 505-507, as shown in FIGS. 5G-5H, with the same or differing thicknesses, thermal conductivities, and reflectivities, in the thermal storage solution system. Materials 505-507 may comprise a refractory material able to withstand high temperatures (e.g., graphite, ceramic, other porous refractory insulating material, radiation shield, and other solid structure). In some examples, materials 505-507 may have thermal conductivities of approximately <5 W/mK, or higher if more layers (e.g., plates, felts) than shown are included. Materials 505-507 can be independently inserted and extracted between the heat receiving unit 600 and other components of the thermal storage system (e.g., re-radiator 110, throttle 500, and thermal storage medium 100). Materials 505, 506, 507 each may have a given temperature drop across its thickness. In some examples, two or more of materials 505-507 may have the same given temperature drop. In other examples, each of materials 505, 506, and 507 may have different given temperature drops. By inserting and extracting various combinations of materials, the temperature of re-radiator 110 may be held constant. In an exemplary configuration, as shown in FIG. 5G, materials 505, 506, 507 may be provided between heat receiving unit 600 and other components of the thermal storage solution, each of materials 505, 506, 507 configured to act as radiators themselves, in addition to or instead of re-radiator 110. In another exemplary configuration, as shown in FIG. 5H, material 505 may be removed leaving materials 506-507 as part of the thermal storage system, or vice versa leaving only material 505 as part of the thermal storage system. In some examples, there may be more or fewer materials than shown in FIGS. 5G-5H.

Figures 6A, 6B:
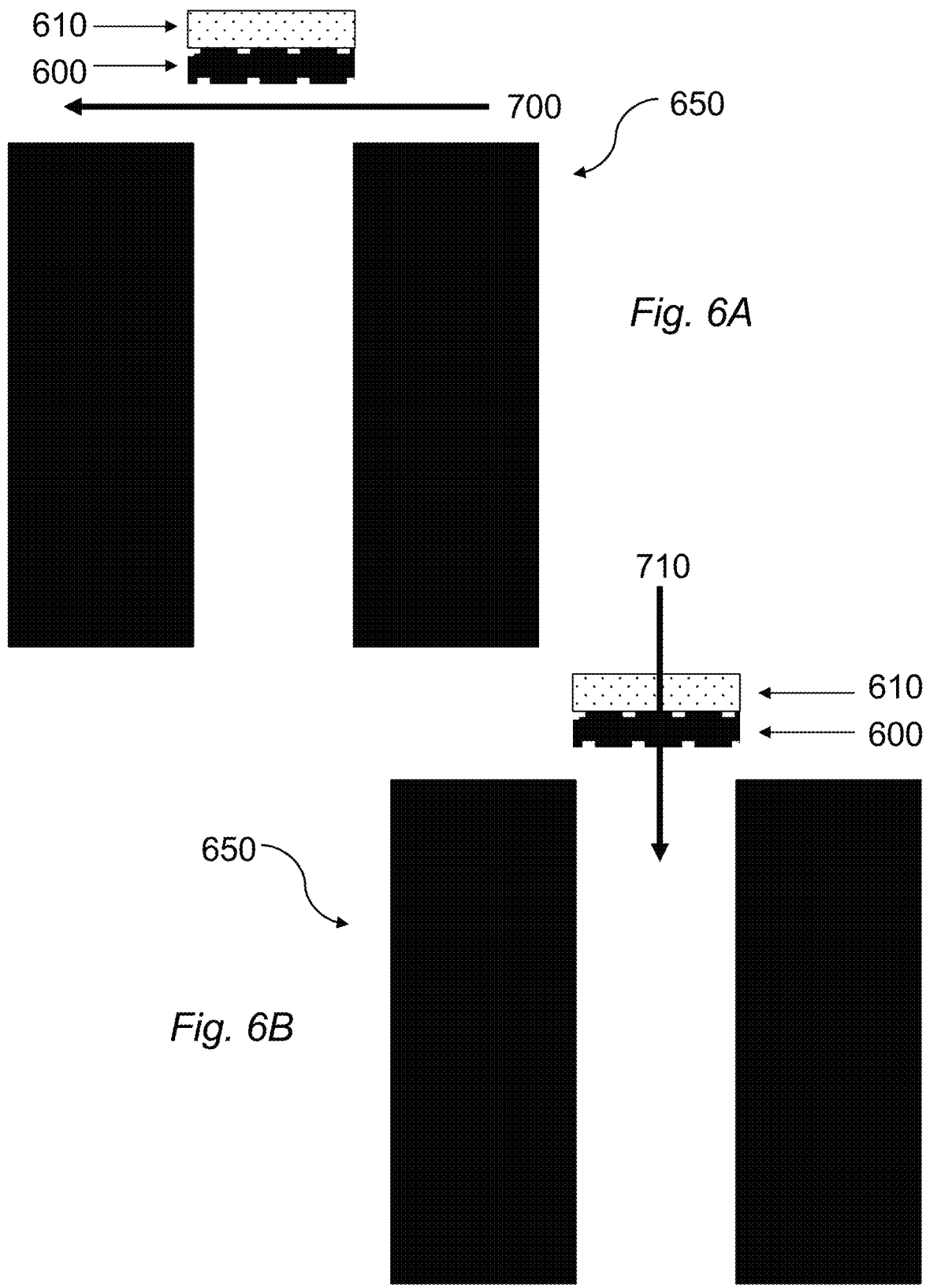
FIGS. 6A-6B are cross sectional views of gas flow in relation to a heat receiving unit, in accordance with one or more embodiments.

In a thermal storage solution, the heat receiving unit 600 discharges electricity when at least one of high temperature thermal storage medium 100, re-radiator 110, and throttle materials 505, 506, 507 have a view factor to the heat receiving unit 600. In some embodiments, hot zone 400 contains particulates and/or contaminants that deposit on various surfaces, including a surface of the heat receiving unit 600. As these deposits may reduce the electrical conversion efficiency of heat receiving unit 600, the thermal storage solution may be designed to prevent, and to clean, such deposits. In FIG. 6A, a gas 700 is shown horizontally flowing across the heat receiving unit 600 to prevent deposits. In another embodiment, the horizontal gas 700 is flowed periodically at higher velocities to remove and clean any deposits on the heat receiving unit 600. In another embodiment, as shown in FIG. 6B, the gas 710 is vertically flowed through the heat receiving unit 600 to prevent deposits.

Figure 7A:
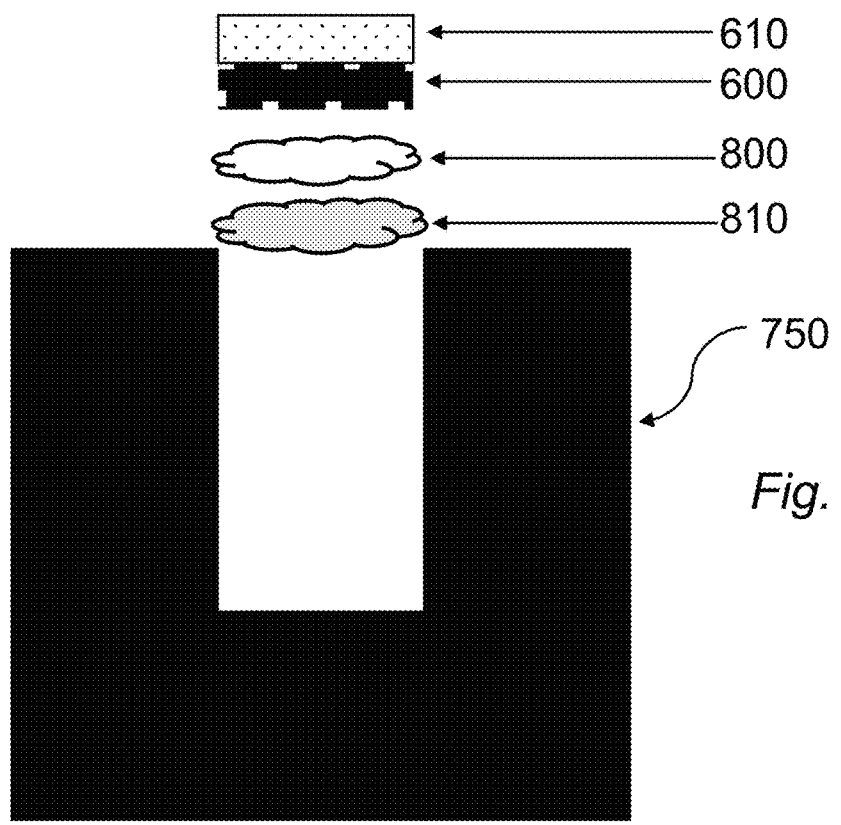
FIGS. 7A-7B are cross sectional views of exemplary gases with different densities provided between a thermal storage medium and a heat receiving unit, in accordance with one or more embodiments.
Figure 7B:
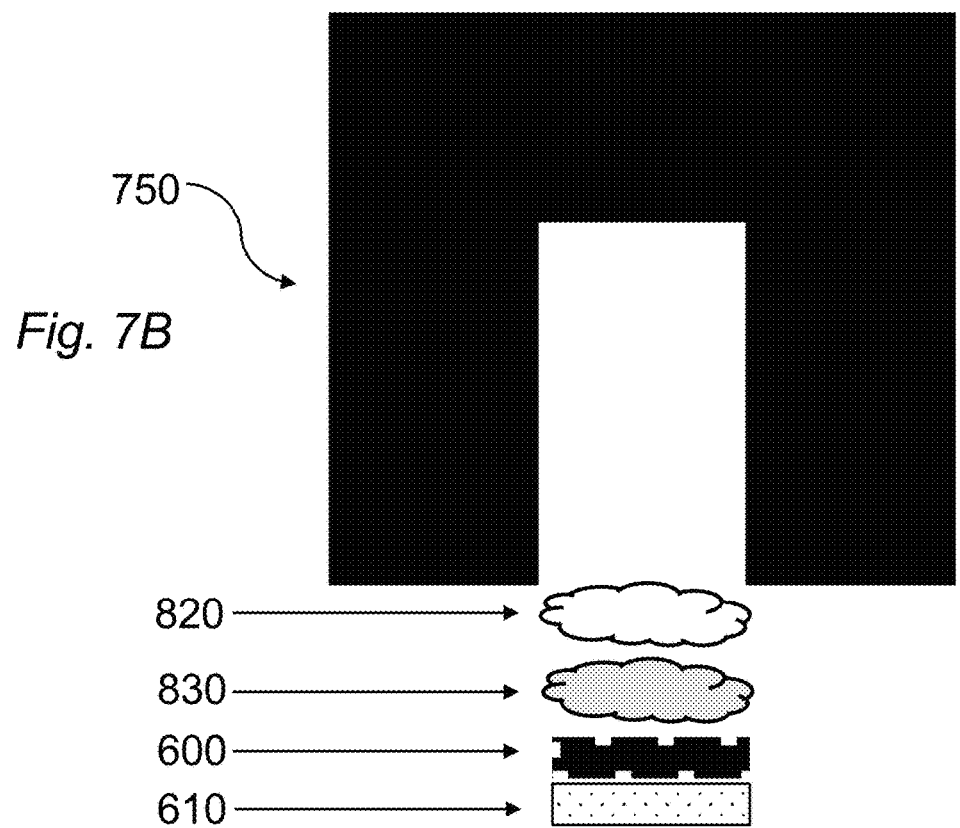

FIGS. 7A-7B indicate how gases with different densities may be used between the thermal storage medium 100 and the heat receiving unit 600 to create isolation areas to limit or prevent deposits onto the heat receiving unit 600. In FIG. 7A, a less dense gas 800 is provided on top of the more dense gas 810, resulting in particulates and/or contaminates in the more dense gas 810 remaining there (e.g., in the area with the more dense gas) and not being deposited onto heat receiving unit 600. In FIG. 7B, a more dense gas 830 is provided below the less dense gas 820, resulting in particulates and/or contaminates in the less dense gas 820 remaining there and not being deposited onto the heat receiving unit 600. In other embodiments, the heat receiving unit 600 may be cleaned (e.g., periodically or as needed) with a liquid or other fluid. In still other embodiments, the heat receiving unit 600 may be cleaned mechanically by brushing, wiping, and/or rolling, or similar mechanism. In yet other embodiments, the heat receiving unit 600 may be cleaned by vibration of the heat receiving unit 600.

As described herein, the heat receiving unit 600 efficiency may be reduced when particulates and/or contaminants are deposited onto its surface. The motion of these particulates and/or contaminants within the thermal storage solution are primarily driven by convection and gravity as shown in FIGS. 8A-8C. With heat receiving unit 600 on the top of the thermal storage solution, as shown in FIG. 8A, upward convection is the driving factor of deposition onto the heat receiving unit 600. With the heat receiving unit 600 on the bottom of the thermal storage solution, as shown in FIG. 8B, downward gravity is the driving factor of deposition onto the heat receiving unit 600. With the heat receiving unit 600 on the side of the thermal storage solution, as shown in FIG. 8C, both convection and gravity are parallel to heat receiving unit 600, thereby reducing the deposition onto the heat receiving unit 600. The gravity of FIG. 8C can also be configured to be perpendicular (into, out of) the page, achieving the same result of the heat receiving unit 600 on the side of the thermal storage solution.

Figure 9:
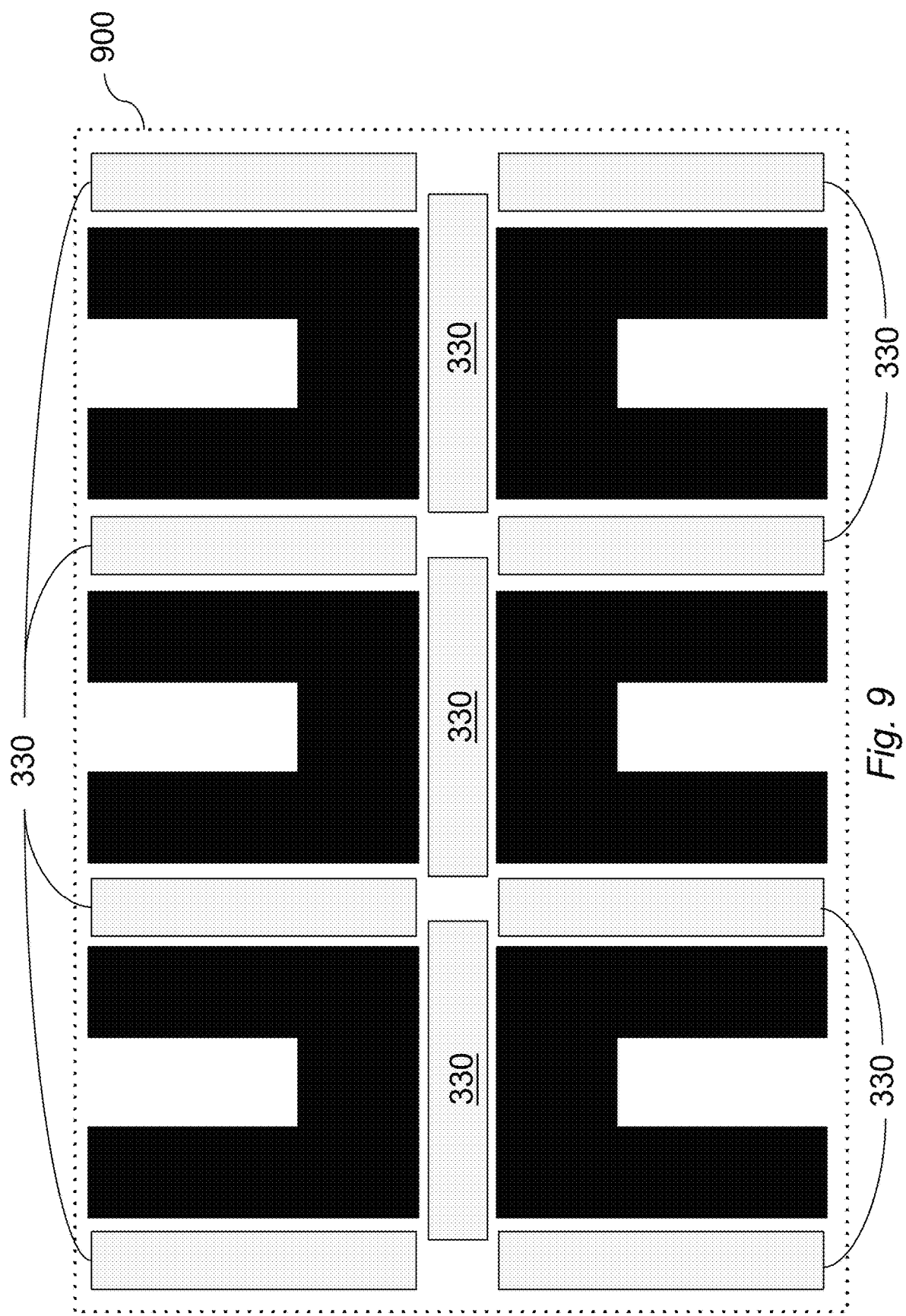
FIG. 9 is a simplified schematic diagram depicting a plurality of thermal storage medium blocks unit cells configured in a thermal storage system, in accordance with one or more embodiments.

One of the many benefits of the thermal storage solution described herein is that both the rated power and energy density of the system can be scaled by adding more unit cells, as shown in the FIG. 9 system schematic. By surrounding each thermal storage medium 100 with insulation 330, each unit cell can be charged and discharged independently from the other unit cells. In one embodiment, this allows one or many unit cells to be serviced and maintained while the other unit cells remain charged and operational.

Another benefit of the unit cell configuration is that the collection of unit cells may be constructed in a single enclosure 900 which reduces overall system enclosure costs. The combination of unit cells insulated from each other in a single enclosure 900 allows for individual cell operation and maintenance, thereby reducing overall system enclosure costs.

In other embodiments, a thermally isolated unit cell architecture allows for the creation of a thermocline, wherein a pipe system having a length of pipe in radiative contact with a surface of a trough or slot or other void space of a unit cell (e.g., a thermal storage medium, as described herein) of a thermal storage solution is configured to carry a fluid medium configured to transport heat energy from a thermal storage medium to be converted into usable heat energy (e.g., by a heat receiving unit, as described herein). In FIG. 10, each thermally isolated unit cell (e.g., insulated by insulation 330) may be at a different temperature, for example, from approximately or greater than 500° C. up to approximately or greater than 1000° C. In other embodiments, the temperatures of each unit cell can be heated to a temperature in the range (e.g., ambient to >2000° C.) of the thermal storage solution. By routing pipes 333 into a trough or slot or other void space of each unit cell, a fluid medium (e.g., liquid, gas, supercritical fluid) can enter at end 331 of pipes 333 and exit end 332 at a higher temperature, the arrows shown indicating a direction of flow. With each unit cell being at a slightly higher temperature than a preceding unit cell, the liquid may be heated to a desired output temperature with higher efficiency when compared to having all unit cells at the same or similar higher temperatures. In a thermal storage solution, this allows heat energy to be extracted from unit cells at temperatures lower than a Discharge Temperature of the heat receiving unit 600. Therefore, although the unit cell is no longer able to provide sufficient radiant heat to the heat receiving unit 600 to generate electric energy, the remaining thermal energy in the unit cell may be extracted via routing pipes 330 for the thermal energy to be used for various commercial and industrial processes requiring heat. In other embodiments, routing pipes 330 may be embedded within, adjacent, or underneath the thermal storage medium 100 of the unit cells.

Figure 11A:
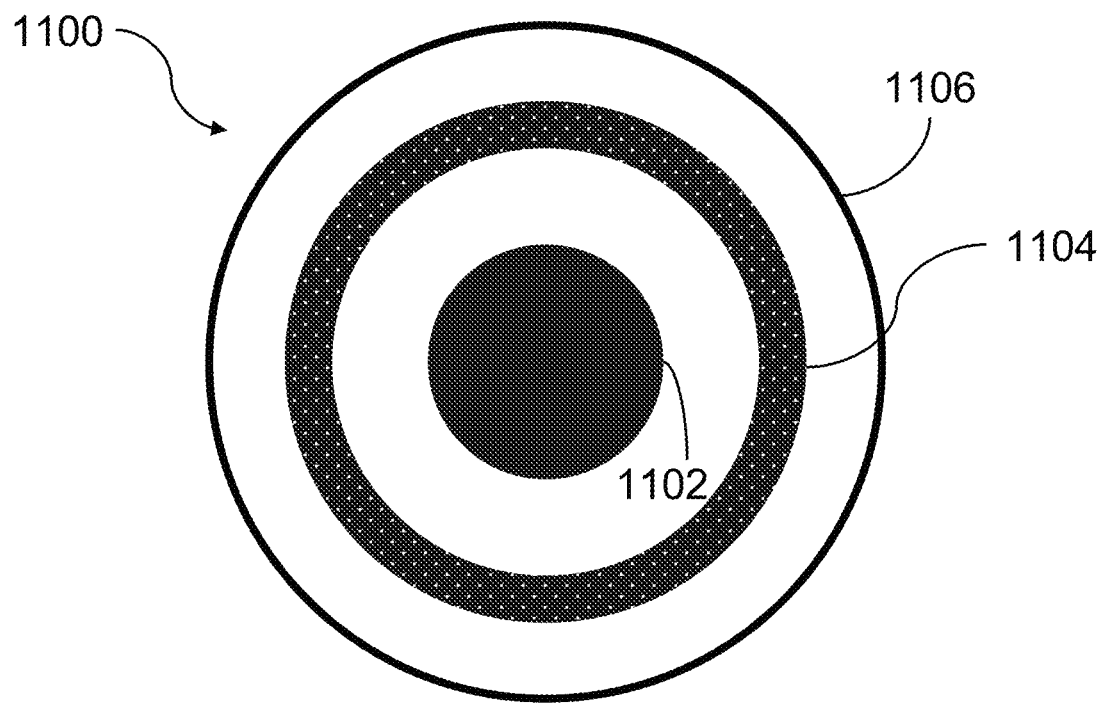
FIGS. 11A-B are cross sectional views of alternative exemplary thermal storage medium configured for radiative thermal charging and discharging, in accordance with one or more embodiments.
Figure 11B:
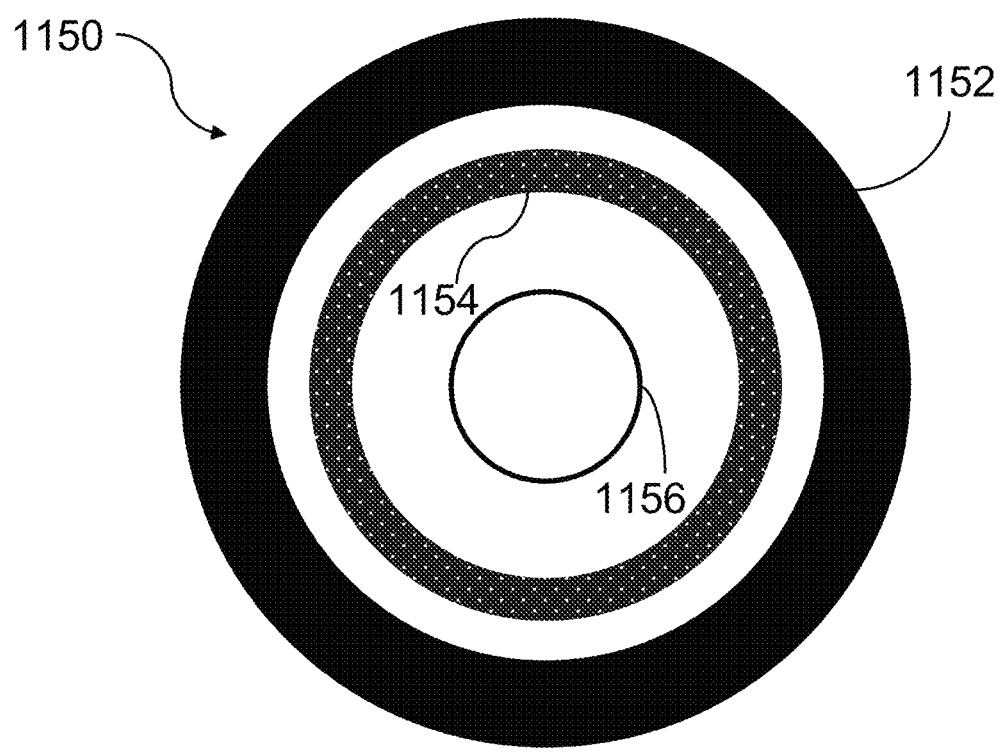

FIGS. 11A-B are cross sectional views of alternative exemplary thermal storage medium configured for radiative thermal charging and discharging, in accordance with one or more embodiments. Thermal storage solution 1100 includes thermal storage medium 1102, mechanism 1104, and heat receiving unit 1106 in a radially symmetric design with thermal storage medium 1102 at or near the core or center of the system and heat receiving unit 1106 forming an outer cylindrical structure of the system. Thermal storage solution 1150 includes thermal storage medium 1152, mechanism 1154, and heat receiving unit 1156, in a different radially symmetric configuration with thermal storage medium 1152 forming an outer cylindrical structure and heat receiving unit 1156 at or near the core or center of the system. In some examples, mechanisms 1104 and 1154 may comprise one or more of the structures or materials (e.g., solid, liquid, gas, and other fluids) described herein for controlling an amount of heat being received by the heat receiving unit (e.g., in FIGS. 4A-5L).

Cylindrical (i.e., void) spaces between components of thermal storage solutions 1100 and 1150 may serve the same or similar purposes as troughs and slots and other spaces in and around thermal storage media, as described herein. For example, heating elements, electrodes, insulating materials, and other heat shielding materials may be placed or deployed in said cylindrical spaces, coupled to or within radiative range of, one or more components of thermal storage solutions 1100 and 1150, as described herein.

Figure 12:
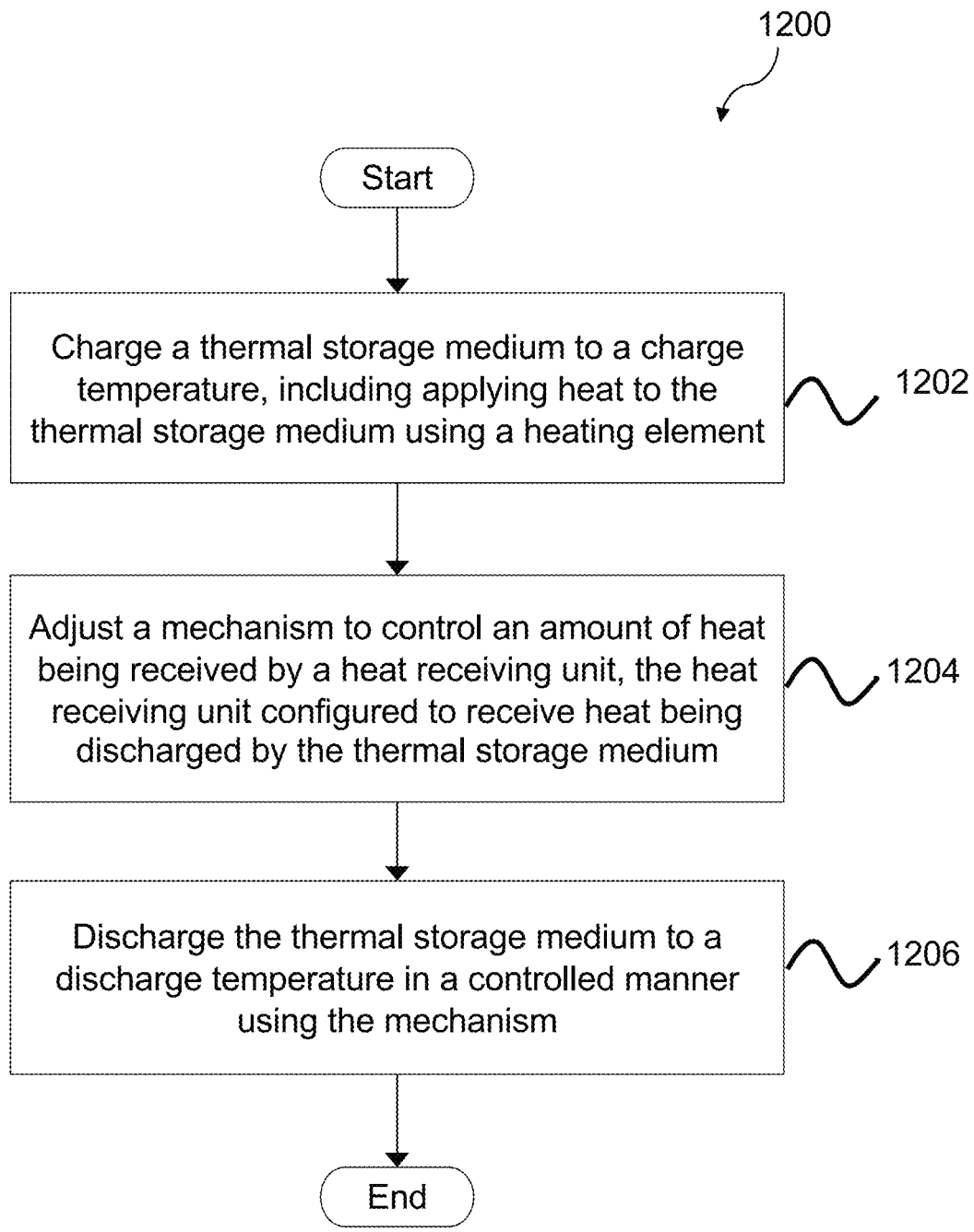
FIG. 12 is a flow diagram illustrating an exemplary method for charging and discharging a thermal storage solution, in accordance with one or more embodiments.

FIG. 12 is a flow diagram illustrating an exemplary method for charging and discharging a thermal storage solution, in accordance with one or more embodiments. Method 1200 begins with charging a thermal storage medium (e.g., thermal storage medium 100 as shown in FIGS. 1A-4 and 6A-10) to a charge temperature at step 1202. In some examples, said charging may include applying heat to the thermal storage medium using a heating element, as described herein. A mechanism (e.g., louvers, overlapping concentric plates, overlapping slot plates, door-like mechanisms, materials configured to cause a given temperature drop across its thickness, and other mechanisms descried herein) may be adjusted (e.g., partially or fully opened, closed, inserted, removed, and otherwise manipulated) to control an amount of heat being received by a heat receiving unit, at step 1204. In some examples, the heat receiving unit may be configured to convert heat into electric energy, as described herein. In some examples, the mechanism may be configured to control a view factor between the thermal storage medium and the heat receiving unit. The thermal storage medium may be discharged to a discharge temperature in a controlled manner using the mechanism, at step 1206. In some examples, the method also may include deploying an insulating material or other structure to prevent heat loss (e.g., parasitic heat loss) from a thermal storage medium through idling charging systems, such as heating elements and electrodes (e.g., see FIGS. 2A-3F).

To facilitate an understanding of the subject matter described herein, many aspects are described in terms of sequences of actions. The description herein of any sequence of actions is not intended to imply that the specific order described for performing that sequence must be followed. All methods described herein may be performed in any suitable order unless otherwise indicated herein or otherwise clearly contradicted by context.

The use of the terms "a" and "an" and "the" and similar references in the context of describing the subject matter (particularly in the context of the following claims) are to be construed to cover both the singular and the plural, unless otherwise indicated herein or clearly contradicted by context. The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. Furthermore, the foregoing description is for the purpose of illustration only, and not for the purpose of limitation, as the scope of protection sought is defined by the claims as set forth hereinafter together with any equivalents thereof. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

While specific examples have been provided above, it is understood that the present invention can be applied with a wide variety of inputs, thresholds, ranges, and other factors, depending on the application. For example, the time frames and ranges provided above are illustrative, but one of ordinary skill in the art would understand that these time frames and ranges may be varied or even be dynamic and variable, depending on the implementation.

As those skilled in the art will understand, a number of variations may be made in the disclosed embodiments, all without departing from the scope of the invention, which is defined solely by the appended claims. It should be noted that although the features and elements are described in particular combinations, each feature or element can be used alone without other features and elements or in various combinations with or without other features and elements. The methods or flow charts provided may be implemented in a computer program, software, or firmware tangibly embodied in a computer-readable storage medium for execution by a general-purpose computer or processor.

What is claimed is:

1. A system for storing energy comprising:
   an insulated container comprising a thermal storage medium;
   a heating element configured to heat the thermal storage medium;
   a heat receiving unit;
   a throttle positioned between the thermal storage medium and the heat receiving unit; and
   a re-radiator positioned between the throttle and the heat receiving unit such that the re-radiator is configured to receive power radiated from the thermal storage medium through the throttle and the heat receiving unit is configured to receive power radiated from the re-radiator; wherein
   the throttle is adjustable between a plurality of configurations including a first configuration and a second configuration, the second configuration being a more closed configuration compared to the first configuration such that less power is received by the re-radiator from the thermal storage medium than in the first configuration, and wherein the second configuration is not a fully closed configuration; and
   the throttle is dynamically controlled to maintain the re-radiator at a constant temperature as the temperature of the thermal storage medium changes over time.

2. The system of claim 1, wherein the heating element is configured to heat the thermal storage medium using thermal radiation.

3. The system of claim 1, wherein the heating element is configured to heat the thermal storage medium using conduction.

4. The system of claim 1, wherein the heating element is configured to heat the thermal storage medium using induction.

5. The system of claim 1, wherein the heating element is configured to heat the thermal storage medium using radio frequency.

6. The system of claim 5, wherein the radio frequency comprises a microwave.

7. The system of claim 1, wherein the heating element is configured to heat the thermal storage medium by passing electrical current through the thermal storage medium, thereby increasing the temperature of the thermal storage medium through Joule heating.

8. The system of claim 1, wherein the heating element is configured to heat the thermal storage medium using arc heating.

9. The system of claim 1, wherein the heating element is configured to heat the thermal storage medium using plasma heating.

10. The system of claim 1, wherein the heating element is configured to heat the thermal storage medium using laser heating.

11. The system of claim 1, wherein the heating element is configured to apply heat radiatively to a surface of the thermal storage medium.

12. The system of claim 11, wherein the surface defines a side of a trough or slot of the thermal storage medium.

13. The system of claim 1, further comprising an electrode coupled to the heating element.

14. The system of claim 13, wherein the electrode is removably coupled to the heating element.

15. The system of claim 13, further comprising a thermal insulating cap removably coupled to the electrode, wherein the electrode is permanently coupled to the heating element.

16. The system of claim 13, further comprising a charging coupler removably coupled to the electrode.

17. The system of claim 1, wherein the heat receiving unit comprises a pipe system configured to transport a fluid medium, the pipe system comprising a length of pipe within radiative range of a surface of the thermal storage medium, the fluid medium configured to transport heat energy from the thermal storage medium to be converted into usable heat energy.

18. The system of claim 17, wherein the surface is located in a trough or slot of the thermal storage medium.

19. The system of claim 1, wherein the throttle is configured to control a view factor between the thermal storage medium and the re-radiator.

20. The system of claim 19, wherein the throttle comprises a mechanical interface comprising a louver.

21. The system of claim 19, wherein the throttle comprises a mechanical interface comprising a concentric plate.

22. The system of claim 19, wherein the throttle comprises a mechanical interface comprising a slot plate.

23. The system of claim 19, wherein the throttle comprises a material configured to cause a given temperature drop across its thickness.

24. The system of claim 1, wherein the heat receiving unit comprises a thermophotovoltaic (TPV) heat engine.

25. The system of claim 1, wherein the heat receiving unit is configured to convert power received from the re-radiator into electric energy.

26. The system of claim 1, wherein the heat receiving unit is configured to carry heat to a heat engine configured to convert the heat into electrical energy.

27. A system for storing energy comprising:

a container comprising a plurality of thermal storage media, each thermal storage medium comprising a trough or slot;

a heating element associated with each thermal storage medium, the heating element configured to the thermal storage medium;

a heat receiving unit;

an insulation placed between a first surface of one of the plurality of thermal storage media and a second surface of a neighboring insulated container, the first surface facing the second surface; and a throttle positioned between one or more of the thermal storage media and the heat receiving unit;

a re-radiator positioned between the throttle and the heat receiving unit such that the re-radiator is configured to receive power radiated from the one or more of the thermal storage media through the throttle and the heat receiving unit is configured to receive power radiated from the re-radiator; wherein the throttle is adjustable between a plurality of configurations including a first configuration and a second configuration, the second configuration being a more closed configuration compared to the first configuration such that less power is received by the re-radiator from the one or more of the thermal storage media than in the first configuration, and wherein the second configuration is not a fully closed configuration; and the throttle is dynamically controlled to maintain the re-radiator at a constant temperature as the temperature of the thermal storage medium changes over time.

28. The system of claim 27, wherein each thermal storage medium is insulated from a neighboring one of the thermal storage media in the container.

29. The system of claim 27, wherein the heat receiving unit comprises a thermophotovoltaic (TPV) heat engine.

* * * * *